(12) United States Patent
Lauer et al.

(10) Patent No.: US 10,691,844 B2
(45) Date of Patent: Jun. 23, 2020

(54) MULTI-USER CLOUD PARAMETRIC FEATURE-BASED 3D CAD SYSTEM WITH BRANCH AND MERGE

(71) Applicant: PTC Inc., Boston, MA (US)

(72) Inventors: Michael R. Lauer, Harvard, MA (US); Ilya Baran, Cambridge, MA (US); Nicholas J. Eyre, Sunnyvale, CA (US); Louis V. Gallo, III, Phoenix, AZ (US)

(73) Assignee: PTC Inc., Boston, MA (US)

( * ) Notice: Subject to any disclaimer, the term of this patent is extended or adjusted under 35 U.S.C. 154(b) by 0 days.

(21) Appl. No.: 16/570,081

(22) Filed: Sep. 13, 2019

(65) Prior Publication Data

US 2020/0004895 A1 Jan. 2, 2020

Related U.S. Application Data

(63) Continuation of application No. 15/052,418, filed on Feb. 24, 2016, now Pat. No. 10,437,938.

(60) Provisional application No. 62/120,672, filed on Feb. 25, 2015.

(51) Int. Cl.
*G06F 30/00* (2020.01)
*G06F 30/17* (2020.01)
*G06F 111/02* (2020.01)
*G06F 111/04* (2020.01)

(52) U.S. Cl.
CPC ............. *G06F 30/00* (2020.01); *G06F 30/17* (2020.01); *G06F 2111/02* (2020.01); *G06F 2111/04* (2020.01)

(58) Field of Classification Search
CPC .. G06F 17/50; G06F 17/5086; G06F 2217/04; G06F 2217/06; G06F 2111/02; G06F 2111/04; G06F 30/00; G06F 30/17
See application file for complete search history.

(56) References Cited

U.S. PATENT DOCUMENTS

| | | | |
|---|---|---|---|
| 8,351,715 B1* | 1/2013 | Carmichael | G06T 9/001 345/420 |
| 2002/0073180 A1* | 6/2002 | Dewhurst | G06F 17/5018 709/220 |
| 2012/0109589 A1* | 5/2012 | Thompson | G06F 17/5086 703/1 |
| 2012/0109592 A1* | 5/2012 | Potter | G06F 17/50 703/1 |
| 2013/0046855 A1* | 2/2013 | Jiang | G06F 17/2247 709/218 |

* cited by examiner

*Primary Examiner* — Aniss Chad
(74) *Attorney, Agent, or Firm* — Clocktower Law; Erik J. Heels; Michael A. Bartley

(57) ABSTRACT

Disclosed is a parametric feature-based 3D CAD system that allows multiple users to simultaneously edit a parametric feature-based 3D CAD model consisting of 3D parts and assemblies of those parts (3D Model). Several CAD users, each using their own computer, phone, or tablet, can edit the same 3D Model at the same time. Editing may be separate and simultaneous—there is no need for users to worry about locking, checking out, or otherwise restricting each other's access to 3D Models. As a result, users see each other's changes occur in real-time, and may also identify what aspects other users are actively modifying through visible Collaboration Cues.

12 Claims, 28 Drawing Sheets

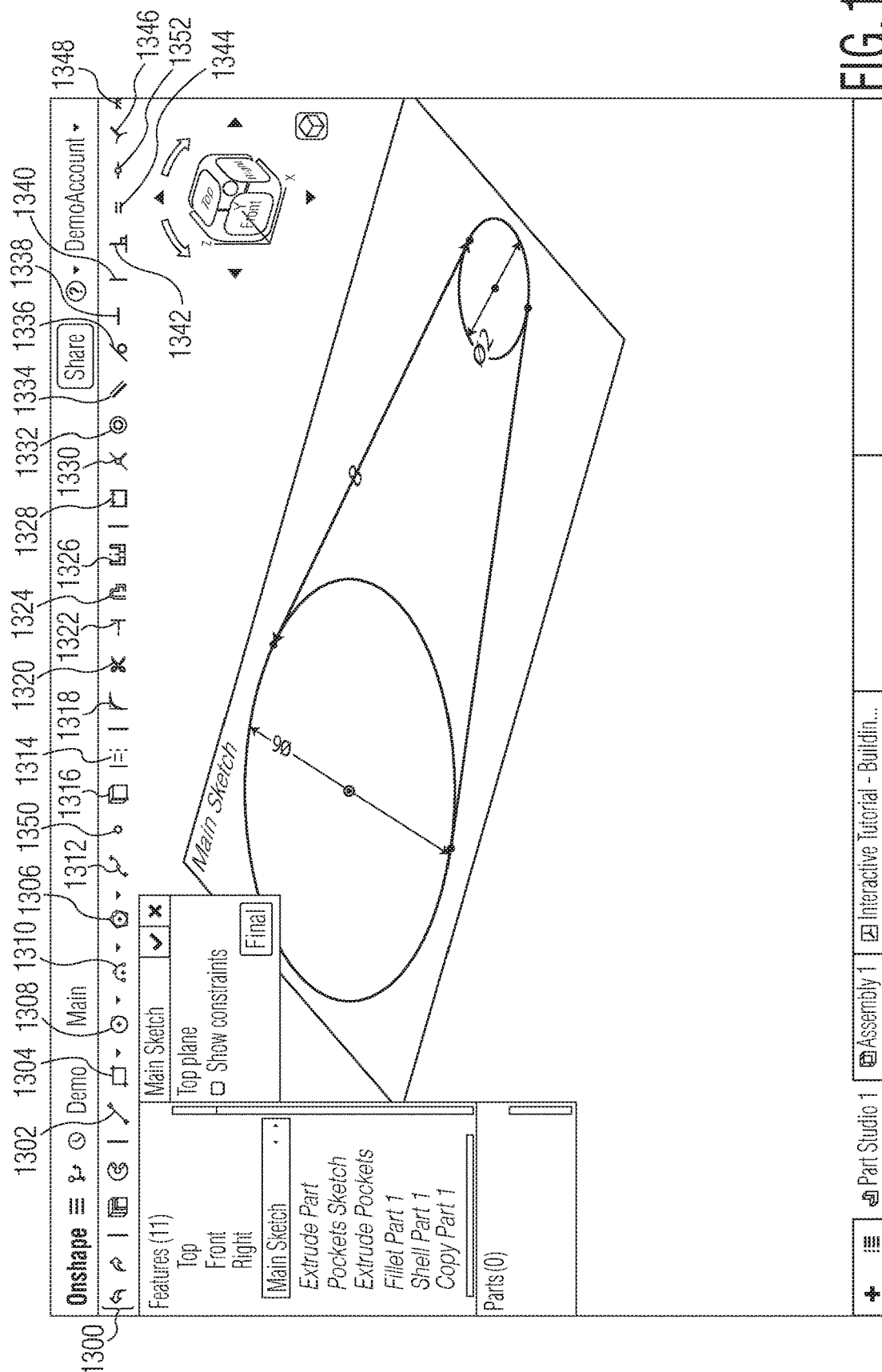

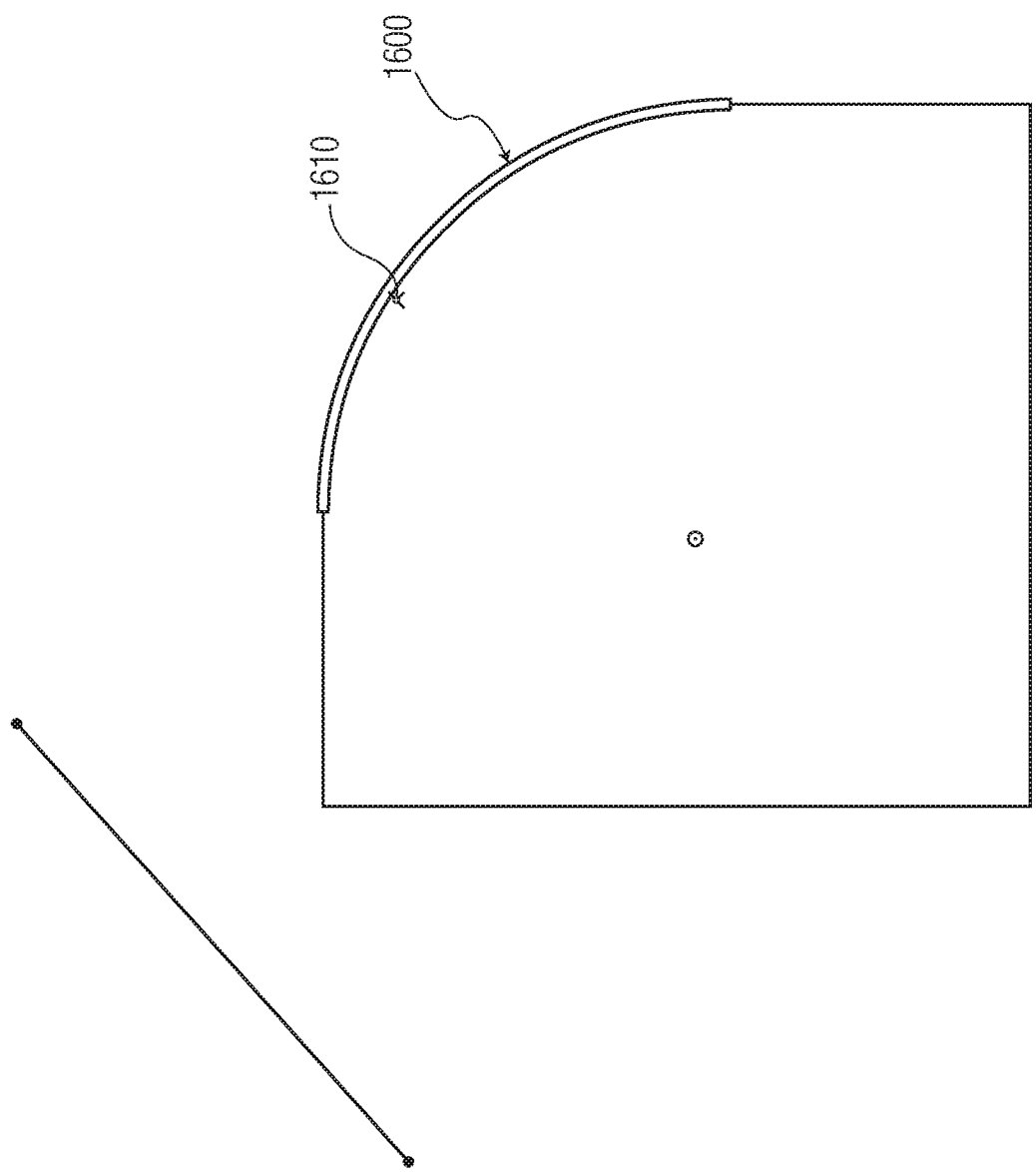

FIG. 25

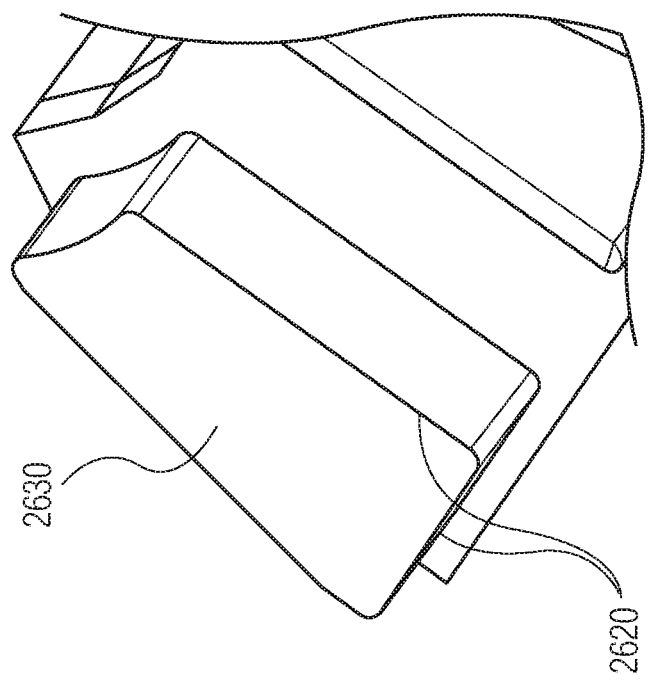
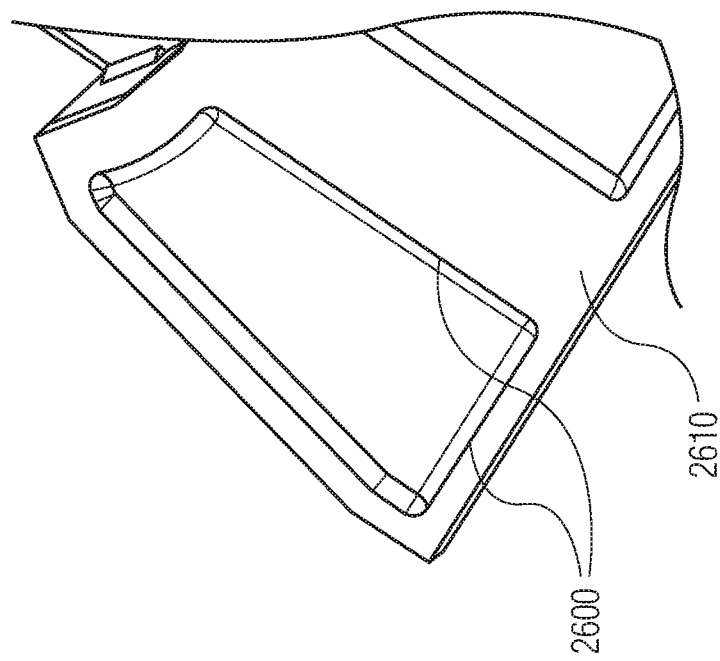

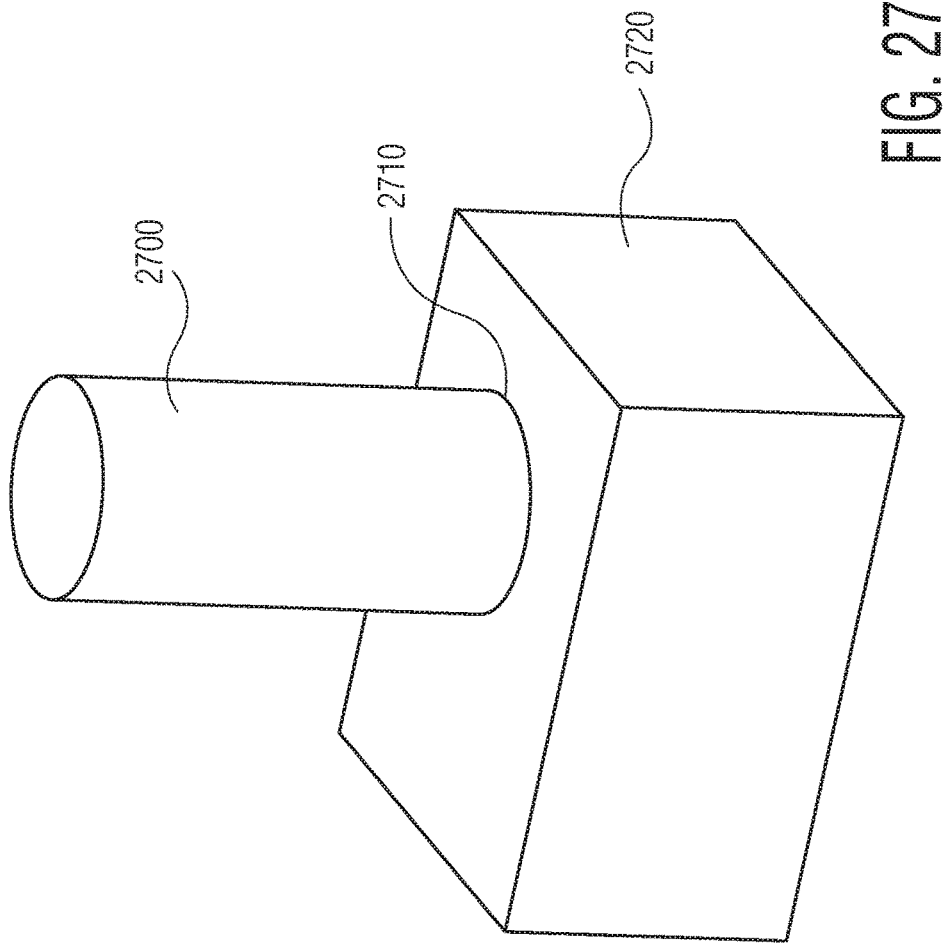

MULTI-USER CLOUD PARAMETRIC FEATURE-BASED 3D CAD SYSTEM WITH BRANCH AND MERGE

CROSS-REFERENCE TO RELATED APPLICATIONS

This utility patent application is a continuation of and claims priority from U.S. patent application Ser. No. 15/052,418, filed Feb. 24, 2016, titled "Multi-User Cloud Parametric Feature-Based 3D CAD System" naming inventors Jon K. Hirschtick, Michael R. Lauer, Scott S. Harris, Paul R. Chastell, Ilya Baran, Lana Saksonov, Ravi Nallapareddy, Nicholas J. Eyre, Karl Evan Nowak, John Rousseau, Rammohan Vangapalli, Andrew John Morris, Steven C. Hess, Philip Gareth Thomas, Daniel Vlasic, Louis V. Gallo, III, Parapura Rajkumar, and Malay Kumar, which claims priority from U.S. provisional patent application Ser. No. 62/120,672, filed Feb. 25, 2015, titled "Multi-User Cloud Parametric Feature-Based 3D CAD System" naming inventors Jon K. Hirschtick, Michael R. Lauer, Scott S. Harris, Paul R. Chastell, Ilya Baran, Lana Saksonov, Ravi Nallapareddy, Nicholas J. Eyre, Karl Evan Nowak, John Rousseau, Rammohan Vangapalli, Andrew John Morris, Steven C. Hess, Philip Gareth Thomas, Daniel Vlasic, Louis V. Gallo, III, Parapura Rajkumar, and Malay Kumar.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2016 Onshape Inc.

BACKGROUND

Field of Technology

This disclosure relates to Computer Aided Design (CAD), and more specifically to a multi-user three-dimensional online CAD system.

Background

Computer aided design (CAD) is a type of software that enables users to design real-world objects, such as machines and other commercial products. Typical CAD users are designers or engineers from businesses or individuals that want to precisely and efficiently create product designs which represent physical objects.

There is a long history of development behind CAD, as design software allows features and functionality beyond the scope and capability of draftsmen working on paper. CAD software can design in two dimensions (2D CAD) or three dimensions (3D CAD). Since 1988, with launch of Pro/ENGINEER, parametric solid modeling has emerged as a mainstream technology for design tools. The basic capability of all parametric solid modeling systems is to allow users to change dimensions (and other parameters such as directions and definitions) of features being generated, allowing the models to be changed. A parametric model in a CAD system is represented by a data structure that in its most basic form is a linear set of features (such as sketches, extrusions, fillets) that are executed in order to create the model. These features define the eventual shape of parts. This is usually called a "parametric history" or "feature list" in products such as PTC's Creo, Dassault Systems' Solidworks, and Autodesk's Inventor. The parametric history is created through a user interface by directly applying features to the 3D CAD parts.

Prior parametric feature-based 3D CAD systems are generally designed for a single user to use at one time. If users work in teams with other users, either copies of a CAD system must be installed on each user's computer, or users need to use a separate collaboration server that works independently of the master CAD model. CAD data must be copied to each user's computer, or to and from a collaboration server. Users must be ever-vigilant to be certain they are not over-writing each other's changes and that they are looking at the current latest version of a CAD model. CAD software and separate collaboration servers need to perform complex tasks to convey changes back and forth between the collaboration servers and the master CAD model.

Existing parametric feature-based 3D CAD systems are generally designed around the use of many files. Each CAD part, assembly, and drawing are typically stored in individual data files in a computer's file system. If users work in teams with other users on a design, copies of all relevant files, CAD and otherwise, are copied to each user's computer. If a new file is introduced, for example for a new part, that file must be copied to all CAD users who need it. If the design needs to be versioned to save a specific state, then all of the many files need to be versioned. External systems such as product data management (PDM) servers are usually needed to perform version control and associate together the many individual files comprising a product design.

Even with external solutions like PDM servers, collaborating and synchronizing work is challenging. A team of designers may wish to collaborate on designing a model, in such a way that each designer works on one part of the model without interference from his or her teammates. When one or all of the designers are finished with their specific tasks, each of their work products must somehow be incorporated into the finished model. Existing CAD systems usually do not provide any real mechanism to do this. Either the model must be subdivided in advance (e.g. as different parts in an assembly), which is not always practical or possible, or each designer's work has to be manually and laboriously re-created in the final design.

Similarly, a designer or team of designers may wish to experiment with a number of different design alternatives to each of several different aspects of a design. The designer(s) may want to mix and match alternatives of different pieces of the model, and as above will need to merge the chosen alternatives together into a final model. This is a challenging exercise under existing CAD systems, which generally lack such enabling tools. It can sometimes be possible to do simple merging of geometry, for example using "boolean" operations, but that only combines the geometry and not the parametric histories or feature lists.

In software development (as opposed to CAD model development), visual comparison and merge tools such as Araxis Merge and Perforce's p4merge are standard. These tools allow a software developer to compare the textual representation of two versions of the same software source code side by side on a line by line basis (lines of code). The differences are highlighted in a color coded manner (new lines, removed lines, modified lines are each different colors). Since the format of the lines of code are very familiar, the software developer can immediately understand what has changed and can incrementally choose to transfer changes from one version to the other. This is true whether the developer is looking at code he or she wrote or code written by others. This methodology is useful both to a software developer working alone and to software developers working in teams. It is also standard practice to use such tools in code reviews.

Some integrated development environments (IDE's) analyze the program structure and display a graphical version of it. They may allow basic editing operations through the graphical version. Some CAD systems, such as SolidWorks, allow embedding programs into the feature history. The entire program is represented as a single feature and the structure of the program is not tied to the user interface. OpenSCAD is a CAD system based on a programming language, but it does not support viewing or editing the model via a non-text-based UI. Thus, CAD development tools lack the functionality and capability of software development tools when it comes to visually comparing or merging development efforts.

CAD systems involve complex solvers to calculate models from parameters and features configured by the user. Most CAD systems include a sketcher, which is a portion of the software that can allows users to create and manipulate curves and geometries in two or three dimensions. Such sketchers include complex relationships which are non-trivial to compute and typically use a commercially available component or other complex library to evaluate. In existing CAD applications that are resident on the user's computer such calculations can be performed and results returned in near real time. However, this requires sufficient processing power on the local machine, and geometric data on the local machine to compute geometries while sketching. As a result, multiple issues exist when moving to a client-server model.

In addition, CAD systems often compute inferences about relationships between various geometric entities to aid user design while sketching. Traditional CAD inferencing performs calculations on a local machine as a user moves the mouse on the screen. With all calculations being on the local machine, any delays with mouse movement can be kept short. However, even with a reasonable powerful machine and local machine calculations, inferencing delays with complex sketches or models may become noticeable.

In a client-server CAD architecture, there are multiple approaches. A simple approach performs all inferencing on the server, where the data and processing power reside. The latency of connection from client to server means that the user receives results much more slowly than in a traditional CAD application. A second approach is to perform all the inferencing on the client. This avoids the latency delays while inferencing, but requires a lot of data transmission pre-inferencing (all the model data needs to move from the server to the client), and requires substantial calculation (processing power) at the client. With large and complex models, this second approach does not scale effectively.

When inferences are calculated, existing geometric entities are often "snapped" to a calculated inference. Solid-Works, Creo, AutoCAD, Fusion, SolidEdge are existing systems for 2D or 3D CAD which perform snapping while inferencing during model sketching. However, all of these products have implementation on a single machine which does not scale effectively to a client-server system with high latency.

Even without inferencing, any geometric movements made while sketching can have latency and performance issues in a server-client model. When dragging entities in a sketch, typically the solver calculates new positions of geometry after every mouse move. With sufficient processing power, these calculations can be made efficiently so that even fairly big sketches can drag quickly. However, in a client-server system when those calculations are on a server, the latency of communication can greatly reduce the rate at which responses are received. For example, with a travel time between client and server of 125 ms each way it will take at least 250 ms plus calculation time to send the drag to the server and get the response back. This results in user-perceived sluggish behavior with the system (and model updates) lagging significantly behind user control.

Beyond user control and complex geometric calculations, a CAD model includes geometry of objects generated through a parametric history and the relationship between them and other objects generated by separate parametric histories. In a typical CAD model with many parts and references, these relationships are often confusing and difficult to manage. References between objects are defined in a context, usually based on a position or logical relationship in an assembly. An issue with every parametric solid modeler is that changes made to one part of a model causes unexpected behavior and failures in other parts of the model.

In the 1980's Pro/ENGINEER tried to minimize these failures by forcing users to completely define all aspects of a design. Every dimension or relationship was required to fully constrain all geometric definitions before any feature or geometric element could be created. This reduced many types of system failures, but was a burden to the user. It was also very possible to build unpredictable behavior despite the restrictions.

In 1995 SolidWorks introduced a parametric modeling system that did not require fully constrained models. It relied on a high quality variational solver from DCUBED and internal software to product a reasonably reliable system. Though better after 20 years of continued development, the system (as well as all other CAD systems) still suffers from failures and unpredictable behavior in may situations. Of particular concern are models where a change is inconsistent with it's construction. For example, if a cut that is referenced by another part is changed such that a referenced edge disappears, the generation of the referencing part will fail.

U.S. Pat. No. 8,214,423 "CAD system" (Stefan Freitag, Jul. 3, 2012) discloses, in the Abstract, "A computer aided design (CAD) system is described where each type of change in a CAD-generated object is automatically and chronologically protocoled so that the object directly includes an abstract description of the history of the object independent of the CAD module used. This is particularly advantageous with decentralized CAD systems in which several constructors/designers are working together on the same draft, but located in different places. At the end of a session, the object history, i.e., the changes which have taken place, are directly exported, together with the object data, into the destination system. The abstract description is in a form independent of the system used." This improves 3D CAD modeling to allow collaboration across multiple CAD systems.

None of the above provides a CAD system enabling three-dimensional, multi-user CAD with online access from any platform or any device, online file storage and handling, non-lagging server-side inferencing, client-side predictive dragging, integrated branching and merging, multi-directional text, feature, and graphical editing, and management of relationships to avoid destructive changes from separate parametric histories. What is needed, therefore, is a CAD system that overcomes the above-mentioned limitations and that includes the features enumerated above.

BRIEF SUMMARY

Disclosed are details of a parametric feature-based 3D CAD system that allows multiple users to simultaneously edit a parametric feature-based 3D CAD model consisting of 3D parts and assemblies of those parts ("3D Model"). Several CAD users, each using their own computer, phone, tablet, wearable computer (e.g., glasses, watch, etc.), or other connected computing device, can edit the same 3D Model at the same time. Editing may be separate and simultaneous—there is no need for users to worry about locking, checking out, or otherwise restricting each other's access to 3D Models. As a result, users see each other's changes occur in real-time, and may also identify what aspects other users are actively modifying through visible "Collaboration Cues."

The Multi-User Parametric Feature Based 3D CAD system is constructed in several parts. Sets of computers ("Servers") perform 3D geometry calculations, manage CAD editing workflow, and manage interactions between user client devices (computers, tablets, phones, etc.) and the CAD editing servers. These sets of computers may be distributed in multiple remote data centers (sometimes referred to as "cloud" or Software-as-a-Service (SaaS) infrastructures). Client software operates on user computer devices to display a graphical interface for CAD editing. Client software may be a dedicated program or application stored on the user computer device, or loaded on demand such as within a web browser with no user installation action required. A network and system of communication passes asynchronous messages among these Servers and the client software. 3D information flow is optimized for rapid model and change dissemination. This solution implements multi-user parametric feature-based 3D CAD without the need for a separate collaboration server, and no need to copy data between a master CAD model and a collaboration server.

Features and Advantages

This multi-user parametric feature-based 3D CAD solution provides many benefits and advantages over prior CAD systems.

- Users complete their work faster and more accurately since there is no need to wait for other users to complete their work and copy files to each other
- Users can work simultaneously on the same 3D models and projects
- Because users do not have to deal with copied files which easily become out of sync, data management complexities requiring complex add-on functionality, often referred to as product data management (PDM) applications, are eliminated.
- Users have better data security of their 3D Models, since there is only one master version of the data with no copies being made as in traditional single-user CAD systems
- Users work is continuously saved without the need for using a Save command
- The system is fault-tolerant, so that even if a portion of the system crashes or stops functioning the users use of the system is not interrupted and the user's work on the 3D Model is not lost
- Users receive real-time feedback ("Collaboration Cues") showing which other users are also editing the same 3D Model including feedback specific to parametric features, such as which parametric 3d feature, parametric or variational sketch, parametric dimension value, or 3D assembly mating relationship other users are editing
- Large (and small) 3D Models show updates quickly to all users, even if they distributed around the world on a wide-area network such as the public internet
- Users achieve high-speed 3D Model operations due to distribution of computing work across a network of computers and also by using CPU's and GPU's on each user's client device
- Users may use Branching of 3D Models to make changes that other users do not need to see
- Users may later use Merging of 3D Models to combine branched changes back into 3D Models that other users have changed
- Users can visualize a textual and/or graphical view of who has performed what work when on a 3D Model, including individual edits, versions, branches, and merges
- Users can restore earlier states of a 3D Model, including states that existed before other users performed edits on the 3D Model
- Users with touch-screen tablets, phones, wearable computing devices, or other touch-based computing device, can use a touch-based user interface, 2D and 3D, to simultaneously edit the same 3D Models with users using web browsers and mice or trackpads
- Client software within a browser allows use without installing any software on the client device
- At any time, a user can designate an autosaved immutable state of the 3D Models on any branch as a named version without requiring creation of files The solution utilizes a Compound Document approach, with additional benefits:

- An entire product design of arbitrary size can be stored in a single Compound Document
- All CAD data (parts, drawings, assemblies, etc) and non-CAD data (PDF files, Word processing files, spreadsheet files, image files, videos, etc.) can be stored as "Tabs" in one compound Document
- CAD data in multiple native CAD formats from multiple different CAD systems can be stored together in a single Compound Document
- Links between data objects, for example an assembly that references a part, are not dependent on often-fragile computer file system naming and folder structures. Thus the user cannot disrupt the state of their CAD data through inadvertent renaming files, reorganizing folders, or copying files in a computer file system.
- An entire Compound Document can be shared with another user for collaboration with only one sharing operation, without the need for many sharing operations to share individual data files, or create a separate "Project" file, or use a separate (PDM) system or servers
- The entire Compound Document can be version controlled in a single operation without the need for multiple version control operations for each of many individual files
- A user is guaranteed to be looking at the correct matching versions of all elements/Tabs in a product design since they are all stored and versioned together in one Compound Document.
- External non-native CAD files that are stored in Tabs in a Compound Document are available to download to recreate exact copies of the original files
- Non-native CAD files stored in a Compound Document can be translated into the native CAD format of the Compound Document-based CAD system via a new additional native CAD data Tab. The original non-native CAD files remain part of the Compound Document, even after translation, and are thus available to all users with access to the Document and can be downloaded again at any time.

A Reference Manager tracks references to instances in order to maintain design integrity if an instance is separately changed. This adds benefits:

Back-up geometry is maintained to prevent changes in one parametric history breaking design in another parametric history Users are made aware of changes non-intrusively Extraneous and inadvertent relationship updates are prevented Users can control what is updated and immediately correct any inconsistencies and prevent inadvertent changes Cases that fail in conventional systems are stable because the existence of back-up geometry enables robust regeneration A history manager tracks changes across multiple versions and workspaces for a design project. This enables:

Visual text and graphical comparison of prior history or different versions of a CAD design A workspace and version graph for an entire CAD design Restoring a previous state is tracked as an entry in history Visual comparison of 3D model side-by-side differences or merged state is available at every change, allowing incremental merging Previous merges and restores are accounted for when merging Client-server performance enhancements allow adjusting what is calculated by the server and when those calculations occur, to maximize client performance for users. This includes:

Inferencing calculations based on current user views and user interface control positioning, with a client-side non-visible buffer holding received inferences Derivative solver estimates provided from the server to a client to simplify calculations and allow predictive geometries to display during user interface interactions Smooth user interface operation occurs independent from latency between a client and a server as well as scale and complexity of a model

BRIEF DESCRIPTION OF THE DRAWINGS

In the drawings, closely related figures and items have the same number but different alphabetic suffixes. Processes, states, statuses, and databases are named for their respective functions.

FIG. 13 is a sketching mode screenshot.

FIGS. 14, 15, & 16 are screenshot showing inferences.

FIG. 25 shows code representation opened while CAD editing.

FIGS. 26A & 26B show part edges defining the edges of another part.

FIG. 27 shows one part with a feature defined by the geometry of another part.

DETAILED DESCRIPTION, INCLUDING THE PREFERRED EMBODIMENT

Figure 1:
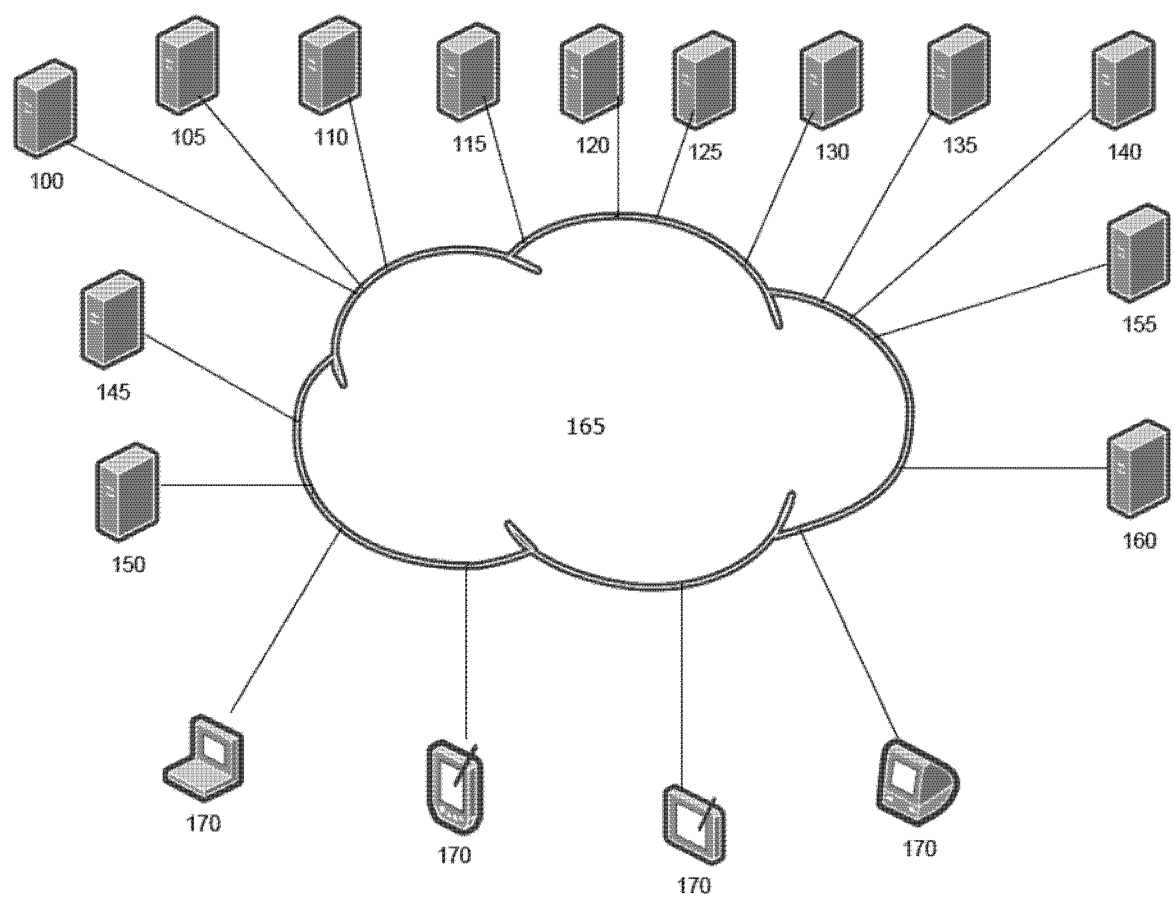
FIG. 1 is a system overview diagram.

In the following detailed description, reference is made to the accompanying drawings which form a part hereof, and in which are shown, by way of illustration, specific embodiments which may be practiced. It is to be understood that other embodiments may be used, and structural changes may be made without departing from the presented scope.

Terminology

The terminology and definitions of the prior art are not necessarily consistent with the terminology and definitions of this disclosure. Where there is a conflict, the following definitions apply.

Assembly—used to assemble parts. An Assembly is used to define the structure and behavior of an assembly. Each Assembly has its own Feature list that contains Instances (of parts and sub-assemblies), Mates, Mate Connectors, Groups, and Relations.

Back up geometry—reference to prior geometry which has been changed.

Branch—workspace for a specific version of a project.

Client Device—computer hardware, such as a desktop computer, tablet, phone, or wearable computer such as glasses or watch, used by a user of the system for three-dimensional multi-user computer aided design.

Client Program—software program running on a client device to access the multi-user cloud CAD system and to provide an interface to a user for interacting with the multi-user cloud CAD system. The software program may be a dedicated application or a web-page driven interface running within a browser.

Compound Document—a single data structure which is actually made up of any number of internal components which traditionally would be stored as separate files.

Compound inference—an inference that is composed of multiple inferences.

Constraint—a relationship between two geometries that mutually limits their positions, e.g., a "coincident" constraint on two points will result in the points having the same location. There are many types of constraints, such as coincident, parallel, perpendicular, tangent and so on. Constraints are logical relationships between geometries. For example, a "parallel" constraint between two line segments will ensure that the two line segments are parallel.

Degrees of freedom—data associated with geometry that explains how (if) that geometry may be repositioned by the solver. For example, a point may be constrained to lie on a fixed line. In such a case its degrees of freedom is translation along that line.

Derivatives—the approximation of the rate of change of a sketch state vector with respect to a dragged geometry state vector.

Dragged Geometry—the geometry being dragged by the user, where dragged means that the user is moving the geometry in some way, such as by clicking and dragging with a mouse or dragging with a finger or stylus on a touch enabled device.

Dragged Geometry State Vector—a subset of a sketch state vector that represents the dragged geometry.

Features—rules or properties configured for a part or an assembly. Features may reference other features as part of their definition.

Feature List—In Part Studios: a parametric history of work, containing features, parts, and a Rollback bar to view work at a certain point in the parametric history; In Assemblies, the Feature list contains an Assembly Instance tree structure, Mates, Groups, and Mate connectors.

Geometry—solid bodies, surfaces, axes, curves, or points and other pieces of shapes that the user can manipulate and which the software will reposition to satisfy constraints. For example, a line segment is a line (straight curve) between two points.

Persistent Transaction History—a set of retained states of all tabs (Part Studio, Assemblies, etc.) of a workspace at each persisted change made within any tab.

In-context reference—within a CAD design program, references that are relationships between geometric objects that are created in separate parametric histories in the context of an assembly are referred to as "in-context" references.

Instance—a reference within an Assembly to either a part defined in a Part Studio, or to a sub-assembly defined in another Assembly.

Inference—a constraint that is detected during sketching and which can be added to the model when geometry is created or repositioned. For example, when drawing a new line, a coincident inference might be found between an end of that line and an existing point in the model.

Mate—a high-level entity used to position instances and define how the instances move (e.g., define movement between parts and/or sub-assemblies).

Mate connectors—local coordinate system entities located on or between parts and used within a mate to locate and orient instances with respect to each other (define where instances connect).

Model—the 3D geometry that is the result of the geometric operations.

Out of sync reference—when referenced geometry or the context that defines the position of referenced geometry changes, the "in-context reference" is called "out of sync".

Parametric history—ordered list of features that when regenerated in order creates geometry of one or more parts.

Part—a named geometric construction, which can be combined and constrained with other parts to create an assembly.

Part Studios—where a user creates parts. A Part Studio contains a Feature list (parametric history) and a list of Parts generated by that feature list.

Project—a Compound Document within the 3D CAD system.

Reference—relationship between design geometry.

Sketch—a collection of 2D geometry and constraints, on a plane.

Sketch State Vector—a vector of numbers that represents all of the geometry in a sketch.

Sketching—the action of modifying a sketch.

Sketcher—a software component that the user uses to create and manipulate geometry and constraints.

Solver—a software component used by the sketcher that takes a collection of geometry and a collection of constraints and repositions geometry as necessary to satisfy the constraints.

Snap—adjustment of geometry so that it coincides with an inference.

Surfaces—Surfaces individually or in sets can be parts or construction entities, and may be used or referenced by various sketching and part modification tools in order to alter or create parts.

The System—one or more interconnected or network connected servers working with one or more Clients across network connections to operate multi-user parametric feature based three-dimensional computer aided design.

Tab—represents an individual design or documentation component stored within a compound document for a project. For example, a tab could represent a Part Studio, an Assembly, a Drawing, or an uploaded file such as a pdf, image, video, or any file stored as it would be in on a computer disk.

Version—a named state of a compound document. Versions are immutable and separate from workspaces. To capture a workspace at a particular point in time, a user can save it as a version.

Workspace—An active modeling/design space.

Operation

The Multi-User Parametric Feature Based 3D CAD System ("System") is constructed in several parts. Sets of computers ("Servers") perform 3D geometry calculations, manage CAD editing workflow, and manage interactions between user client devices (computers, tablets, phones) and the CAD editing servers. Client programs operate on client computing devices to display a graphical interface for CAD editing. The client program may be a dedicated software program or application stored on the client device, or loaded on demand such as within a web browser. A network and system of communication passes asynchronous messages among these Servers and the client software. 3D information flow is optimized for rapid model and change dissemination.

Hardware/System Overview

Referring to FIG. 1, multiple servers communicate with each other and with client devices. As shown in FIG. 1, such communications occur across internet 165. This is preferred, because it extends use anywhere the internet is accessible, but may alternatively be replaced with any network connecting the servers with each other and to client devices. Similarly, individual servers are shown as separate physical devices. These servers may be combined to run on shared devices, or connected internally, but the depicted configuration is preferred to allow geographic distribution of the various servers. The servers shown may be run in multiple mirrored copies distributed geographically, allowing optimization for user connection and performance regardless of location. Each individual copy of a server may be run on a single physical computer, across multiple physical computers (such as a cluster or server farm), or run on one or more physical computers shared with other servers. Each server preferably has dedicated physical resources of eight or more 64-bit, or better, central processing units (CPU's), with eight or more gigabytes (GB) of memory, and a high-speed one gigabit per second or faster network connection between the various servers, although geographic separation across the internet may slow connections (such as between a client and the servers, or between mirrored servers).

Servers

3D Geometry Calculation Servers ("3DGCS") 100 run software including, but not limited to, 3d geometry kernels such as, but not limited to, Parasolid or ACIS; 2d and 3d constraint solvers such as, but not limited to, DCubed DCM2D and DCM3D; and other software that performs geometry calculations to modify computer representations of geometric shapes (for example, but not limited to, drilling a hole or rounding edges), that analyzes the shapes (for example, but not limited to, computing volume or surface area), and creates optimized 3D graphics data such as, but not limited to, triangular facets that may be sent to one or more clients via a CAD editing workflow server over a networking protocol in order to display a 3D image of the object being designed.

CAD Editing Workflow Servers ("CEWS") 105 run software including, but not limited to, an operating system such as Ubuntu or other Linux variant, a web application written in a language such as Java, web application components such as Jetty and Spring, and other software. CEWS receive messages from Client computers and processes over a networking protocol to read and write CAD data from data persistence servers, to perform CAD functions such as modifying CAD features or metadata, coordinate collaboration among users using multiple Clients, and communicate with 3DGCS to do geometric modeling operations for a project. CEWS also, upon request from a Client, send to that Client a set of Client application software such as JavaScript coding that may include 3D WebGL "shader" programs, plus other JavaScript program utilities such as Angular, for operation on the Client device.

Security Credential Management Servers ("SCMS") 110 run software including, but not limited, to an operating system such as Ubuntu or other Linux variant and software that manages credentials for access to the System. The SCMS is also used to centrally manage authentication credentials and authorization rules for secure access to the computers in the System by operations personnel such as systems administrators.

2D Drawing Editing Workflow Servers ("2DDEWS") 115 run software including, but not limited to, an operating system such as Ubuntu or other Linux variant and other software that allows Clients to create and manipulate 2D drawings of their CAD models. The software allows the user to create drawings with cutaway views, precise dimensions, and other drawing items which provides information for the CAD design to be manufactured by a third party and for other purposes.

Data Cache Persistence Servers ("DCPS") 120 run software including, but not limited to, an operating system such as Ubuntu or other Linux variant and commercial or open-source software that allows other components of the System to very quickly store and retrieve data that is frequently accessed such as CAD model information and graphical "thumbnail" representations of CAD models and assemblies.

Document Management Web Servers ("DMWS") 125 run software including, but not limited to, an operating system such as Ubuntu or other Linux variant and commercial or open-source software such as Jetty, Spring and other software written in the Java programming language. DMWS are Internet-facing (optionally through a network load balancer) servers that take network requests from clients in a REST protocol format and reply with information about the user's own CAD projects and projects that the user has the authorization to view. The user can also manipulate CAD projects (for example, but not limited to, create, delete, share, and rename) through communications with DMWS.

Asynchronous Message Broker Servers ("AMBS") 130 run software including, but not limited to, an operating system such as Ubuntu or other Linux variant and commercial or open-source software such as RabbitMQ and other software written in the Java programming language. AMBS take messages sent from the DMWS, CEWS, and other Servers, and distribute those messages to asynchronous message consumer servers in specific geographies for processing based on the type of message. This allows for background processing and a high degree of scalability. Additional AMBS can be dynamically added or removed as system-wide processing needs demand.

Asynchronous Message Consumer Servers ("AMCS") 135 may have lower physical resources (fewer or slower CPU, lower amounts of RAM) than other servers depending on the specific role that an AMCS is performing. AMCS run software including, but not limited to, an operating system such as Ubuntu or other Linux variant and commercial or open-source software such as Jetty, Spring and other software written in the Java programming language. An AMCS takes messages from an AMBS that are specific to a particular role, and processes those messages. Example AMCS roles include, but are not limited to, processing graphical display data generated from the 3DGCS and creating thumbnail images, translating to and from industry standard and other CAD system file formats, and sending user notification emails when projects are shared. AMCS communicate via secure network protocols with data persistence servers and other external services. Additional AMCS can be dynamically added or removed as system-wide processing needs demand.

Data Persistence Servers ("DPS") 140 run software including, but not limited to, an operating system such as Ubuntu or other Linux variant and commercial or open-source software like mongoDB to persist user login account information, user CAD projects, user, project, and system metrics, and other information saved on behalf of the user or the system.

Performance and Health Monitoring Servers ("PHMS") 145 run software including, but not limited to, an operating system such as Ubuntu or other Linux variant and commercial or open-source software such as, but not limited to, logstash, elasticsearch, kibana and zabbix. PHMS continually collect performance and health data from other servers in the System via networking protocols. This data is transmitted via TCP and UDP networking protocols from all other servers running in the system, and is used to provide insight into user behavior, hardware and software failures and system performance.

Figure 2:
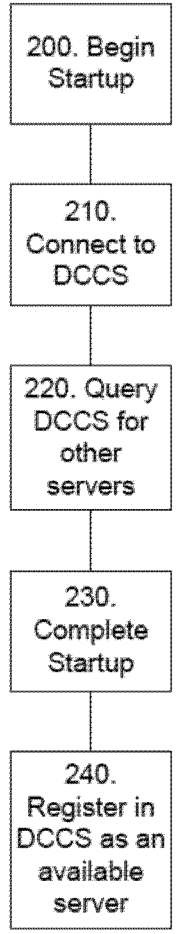
FIG. 2 is a flowchart showing the startup process for a server.
Figure 3:
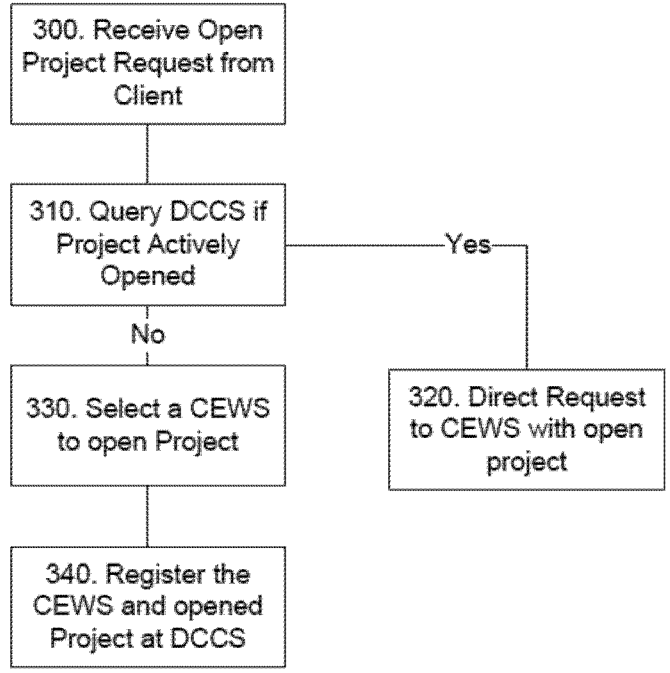
FIG. 3 is a flowchart showing the server selection process when opening a project.

Distributed Configuration Controller Servers ("DCCS") 150 are preferably run in a clustered configuration in a Core data center. DCCS run software including, but not limited to, an operating system such as Ubuntu or other Linux variant and commercial or open-source software such as, but not limited to, zookeeper and puppet. DCCS provide a tree-like persistence mechanism where other servers, including DMWS, 2DDEWS, and CEWS, can read and write configuration keys and values and can listen for notifications if those keys or values (or their children in the tree) change. DCCS provides configuration to all of the other severs in the System. This allows for centralized management of configuration and ensures that configuration is consistent across servers and copies of each server. DCCS also provides service discovery. Each server in the System depends on services provided by other computers in the System. Referring also to FIG. 2, when a server (other than DCCS) is started 200, it connects 210 to and queries 220 the DCCS for the network location for the other needed services, and when the server is fully operational (startup complete) 230 it advertises 240 its own availability through DCCS. DCCS also provides CEWS locations for open projects in order to enable collaboration between CAD users. Referring also to FIG. 3, when a user opens 300 a specific project, the DCCS checks 310 to see if that project is already opened on a specific CEWS. If so, the opening request (as well as further project editing actions) is directed 320 to the specific CEWS, ensuring all users actively working on the same project do so through the same CEWS. If not, the DCCS selects 330 a CEWS (such as based on geographic location, or current server loads, or other performance-focused criteria) to direct the request and open the project, and registers 340 in DCCS a listing of a project identifier associated with the specific selected CEWS.

Distributed Search Servers ("DSS") 155 are preferably run in a clustered configuration in a Core data center. DSS run software including, but not limited to, an operating system such as Ubuntu or other Linux variant and commercial or open-source software such as elasticsearch. DSS provide both data indexing and a search mechanism for locating projects, parts, users, etc. from a query string.

Background Upgrade Servers ("BUS") 160 are preferably run in a parallel configuration in a Core data center. BUS run software including, but not limited to, an operating system such as Ubuntu or other Linux variant, a web application written in a language such as Java, web application components such as Jetty and Spring; and other software. BUS are used in conjunction with 3DGCS at software upgrade time to iterate over all existing CAD projects, upgrade any structures in those projects so that they work correctly with the new software and verify that the upgrade process has not damaged the geometric integrity of the CAD projects.

Figure 4:
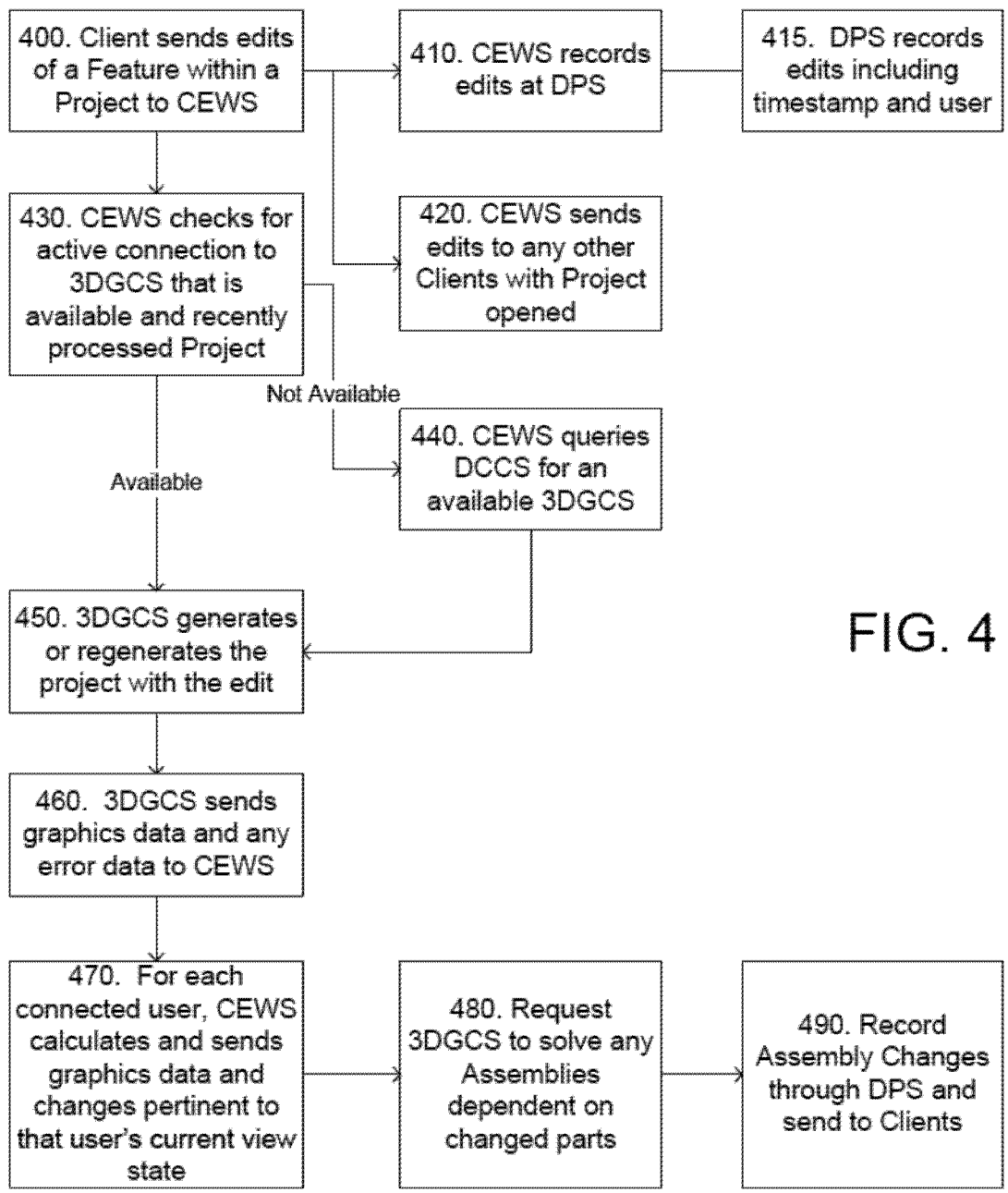
FIG. 4 is a flowchart showing server interaction during a typical user edit within a project.

Users connect through a client program running on a client device. Many different servers may interact, depending on the user action. Initial user connection and verification (secure identification) involves SCMS. Once connected and editing a project, a network websocket connection is established between the client and a CEWS for the opened projected. The CEWS manages user editing and view change actions, while asynchronously sending requests to other servers as needed. Referring also to FIG. 4, in an editing example, the client sends 400 the CEWS a editing message with an identification of a feature being edited, and details about a change. The CEWS asks 410 the DPS to record the edit as an increment on a project branch the user is working on, including 415 a timestamp and user identification. If there have been too many increments since the last full (non-incremental) record, the CEWS asks the DPS to write a full record (as an optimization). The CEWS also sends 420 the edit information to all clients connected to the project (so that they can appropriately update indications about the edit). The CEWS checks 430 if it is connected to a 3DGCS that is available and recently regenerated the part studio in a similar state. If not, the CEWS asks 440 the DCCS for a 3DGCS server and asks it to launch a new 3DGCS process. With a 3DGCS appropriately available, the CEWS sends the change to the 3DGCS (and more project data if needed by a newly available 3DGCS), and generates or regenerates 450 a model based on the changes. The 3DGCS sends 460 a tessellation increment (triangles, polylines, etc), error state, and other graphics data about the features it regenerated back to the CEWS. For each client connected to the project, the CEWS sends 470 back the tessellation and other increments. Because the clients may be in different states, the increments they need may be different and the CEWS computes the appropriate ones for current display on each connected client. If there are, for example, assemblies in the same project referencing a changed part, the CEWS updates these assemblies. This may involve asking 480 3DGCS to solve the assemblies and DPS to record 490 the changes. The CEWS sends changes to the assemblies to all clients connected to the assemblies.

Client

Users interact with the system through one or more clients, each running on a client device 170. Different client programs are designed to allow users to work on CAD projects from different client devices. For example, a user may start a CAD project in a web browser on a desktop computer at work, continue updating the project on the road using a mobile phone, and finish the project on a computer tablet at home. This enables system access and operation from any computing device and from anywhere there is an Internet connection.

Client programs can be generally be classified as either web clients designed to work within a browser through HTML, CSS, JavaScript, and WebGL, or native applications designed for specific platforms such as mobile phones, computer tablets, and other internet appliances and with operating systems such as, but not limited to, iOS and Android. Native applications may implement communications to servers matching the communications performed by web clients, while optimizing appearance and/or interactivity (such as user input and control) specific to an individual platform or line of computing devices.

Web Client

Web clients run inside standard browsers such as, but not limited to, Chrome, Firefox, Safari, Opera, and Internet Explorer, using HTML, CSS, JavaScript, and WebGL. This allows operation without any required installation or plug-in on the client device operating the web client. The web client is light weight and may work with a large number of devices, including, but not limited to, computers, Chromebooks, televisions, gaming consoles, and other Internet appliances. Web clients work with any WebGL compatible browser, such as, but not limited to, Safari, FireFox, and Chrome, running on any computing device with WebGL compatible graphics hardware.

Apps

Native applications (Apps) are built for dedicated system platforms, such as, but not limited to, Apple iOS, Android, and Mac OS X. Apps require download and installation, so in many cases may be less desirable than web clients, but can take advantage of platform-specific features. These apps can be installed on devices such as, but not limited to, computers, tablets, smart phones and other wearable devices like watches and google glass. Apps are designed to provide the best experience possible for a given platform, for example, by optimizing user interaction for the size and orientation of the device's display area, and for unique capabilities such as but not limited to touch interaction and accelerometers.

For example, the iOS app operates on Apple mobile devices including iPhone and iPad. This app utilizes dedicated platform features, including touch gestures, Wi-Fi and cellular networks, and device notifications. For performance and graphics capabilities, the iOS app requires iOS 7 or above.

As another example, the Android app operates on mobile devices running an Android operating system, and, similar to the iOS app, utilizes dedicated platform features including touch gesture control and device notifications. The Android app works with any Android device supporting KitKat or LollyPop or above.

Specific Process Details

Overview

The multi-user cloud-based 3D CAD system presents an editing user interface (UI) for users to design, modify, and share structures. For each user, the system begins with authentication, and then presents various projects to the user. Each project is for the design of one or more structures, or assemblies, which is made up of a collection of instances of parts and sub-assemblies. Each project is made up of multiple data units, referred to herein as tabs, representing the assembly, parts, and other data desired as part of the project. A history of actions, or persistent transaction history, is associated with each project, and the histories may be branched to allow multiple workspaces (and different end assemblies) within the same project. Projects may be shared with multiple users, allowing concurrent editing to occur.

Authentication

A user begins use through a client device. The figures and examples discussed herein generally refer to the web client with browser access such as through a desktop or laptop computer, but the same concepts, operations, and interactions with the servers and user interfaces apply to dedicated apps on any client device, such as a smart phone or tablet, with input controls changed to match those used with the specific device.

A first step may include authentication of the user through the client. A preferred embodiment is through input and verification of a username and password, but alternative forms of secure authentication (for example, but not limited to, two stage authentication or biometric authentication) may be used. A web client may provide an authentication page from the DMWS, while a dedicated app may generate an authentication page (or retain authentication information). The authentication information may pass to the SCMS, and after authentication the DMWS, in conjunction with the DPS and DCPS, may present an overview page for display by the client (or overview information for display through a dedicated app). Alternatively, this may be configured to be a different initial view, such as to present the last view of the user at the most recent prior session.

Projects

Figure 5:
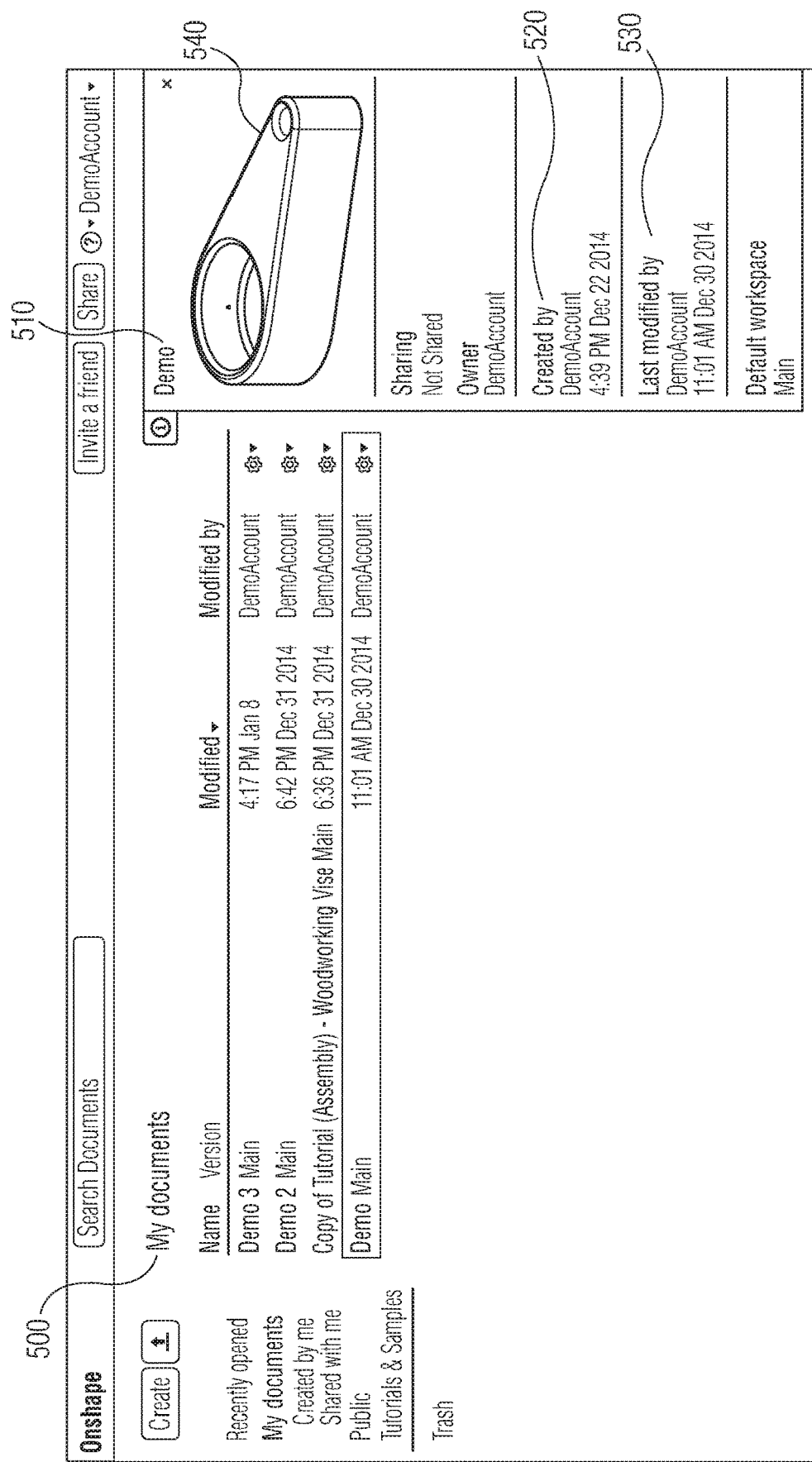
FIG. 5 is a screenshot of the projects overview.

Also referring to FIG. 5, the overview presents various management options as well as access to projects. Within this system, each assembly is retained with all related data (subassemblies, part studios defining parts, and other tabs) in a single compound document (as later detailed). Thus, the interface shown in FIG. 5 refers to projects as documents (notably, "My Documents" 500).

Within the overview, profile management options may allow setting basic information, such as name, company, contact information, and account password. Additionally, default settings may be configured, such as units to use for length, size, or angles. Default settings will apply unless specifically configured at a lower level (such as at a project, workspace, or tab level). The overview may present information about one or more projects, such as name 510, creator 520, last modification 530, and a small or thumbnail visualization 540 may be presented, along with global account information such as last access, total storage use, and any account restrictions such as storage or computational time remaining.

Projects may be listed in various configurable views, such as recently accessed projects, projects created by the account user, projects shared with the account user, and public projects. Each project may provide options to view versions, history, control sharing, delete the project, or open the project for editing.

Project Structure

Figure 6:
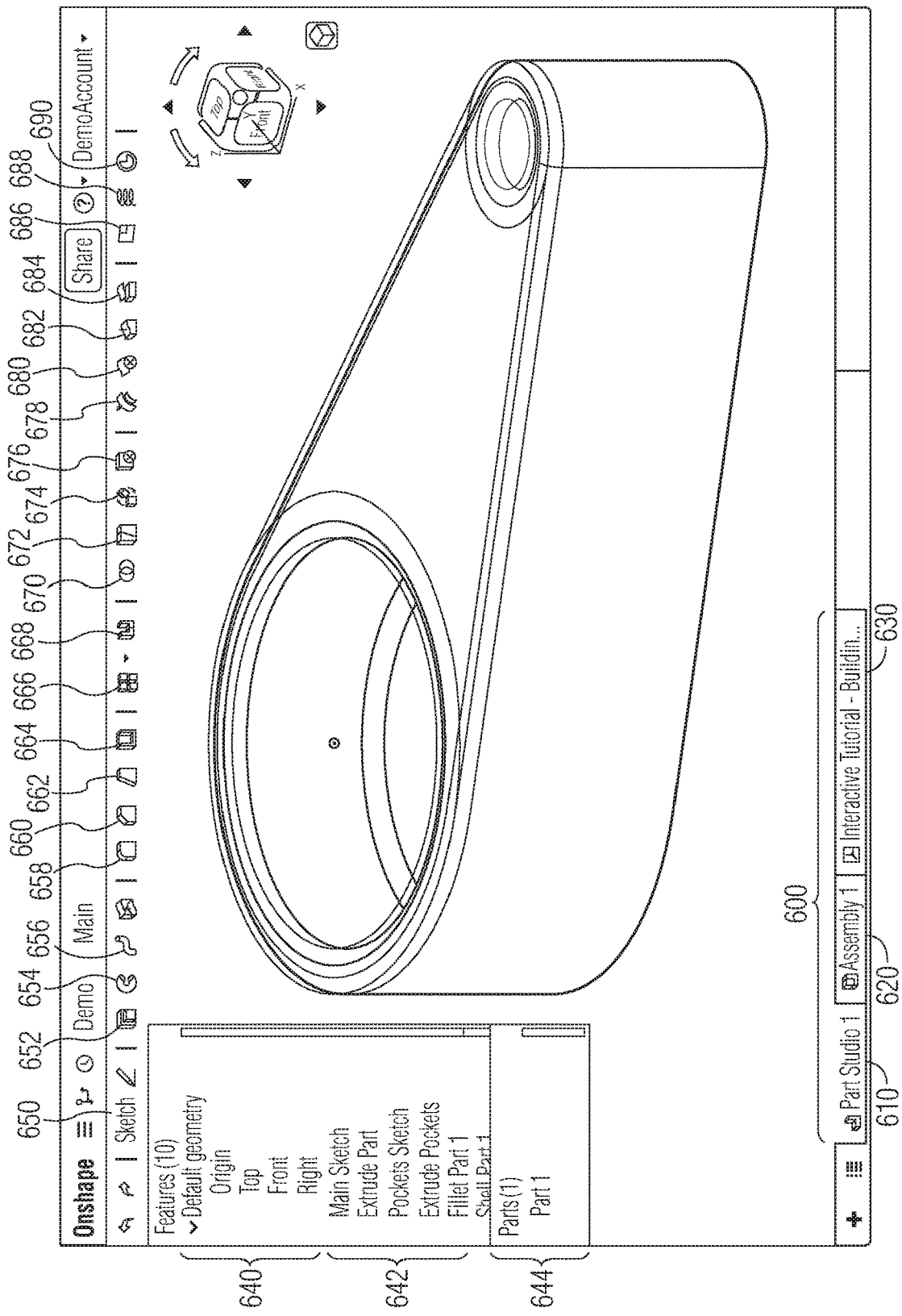
FIG. 6 is a tabbed document screenshot.

Each project is able to store an entire and unlimited-size collection of CAD parts, assemblies, drawings, and arbitrary other CAD and non-CAD data. This collection is stored as a Compound Document by DPS, and it may be shared and/or versioned. As a compound document, it is stored as a single data structure which is actually made up of any number of internal components referred to as tabs, which traditionally would be stored as separate files on a computer disk or storage unit. Referring also to FIG. 6, when viewing a specific project, the internal components are accessible as separate individual tabs 600 accessing individual panes within a project workspace, with each internal component having its own tab. This allows bundling CAD data (such as parts 610, drawings, and assemblies 620) as well as non-CAD data 630 (for example, but not limited to, PDF files, word processing files, and spreadsheet files) into a single project. Management and sharing is simplified, as links between CAD objects, such as an assembly referencing a part, are references internal to the document and not dependent on any file system naming or structure. Users sharing an entire project share access to that single compound document, ensuring all shared users have the same environment with correct references. File system actions, such as users moving or renaming files or folders, do not risk impacting the project due to the single compound document. Versioning (and change tracking) is done at a project level, so automatically applies (and is tracked) across all internal components of the project. This avoids potential conflict of incorrect versions of individual files, and simplifies management by avoiding need to separately track changes and versions of every file involved. This also guarantees that every user accessing a project has the correct matching versions of all elements/tabs, as the tabs are all stored and versioned together in one Compound Document. For use with other systems, or selective distribution, individual tabs may be downloaded as individual files, with such download becoming separate and unlinked from the entire project. Various export or translation options are available for CAD-format tabs, and non-native CAD files that are stored in tabs of the project are available to download to recreate exact copies of the original files.

References may also cross projects. For example, an assembly in one project may reference a part defined in another project. All cross-project references reference only reference data objects that exist within versions. Because versions are immutable, changes to the reference project can never inadvertently change the referencing project. The user receives notifications when new versions become available and may then choose to update or not update.

Client user interface controls may allow uploading, downloading, and translating CAD Data. The system allows users to upload and download CAD files into project tabs as Part Studios, Assemblies or as exact file copies, to translate CAD data, from one type to another, and to export as CAD files.

Figure 7:
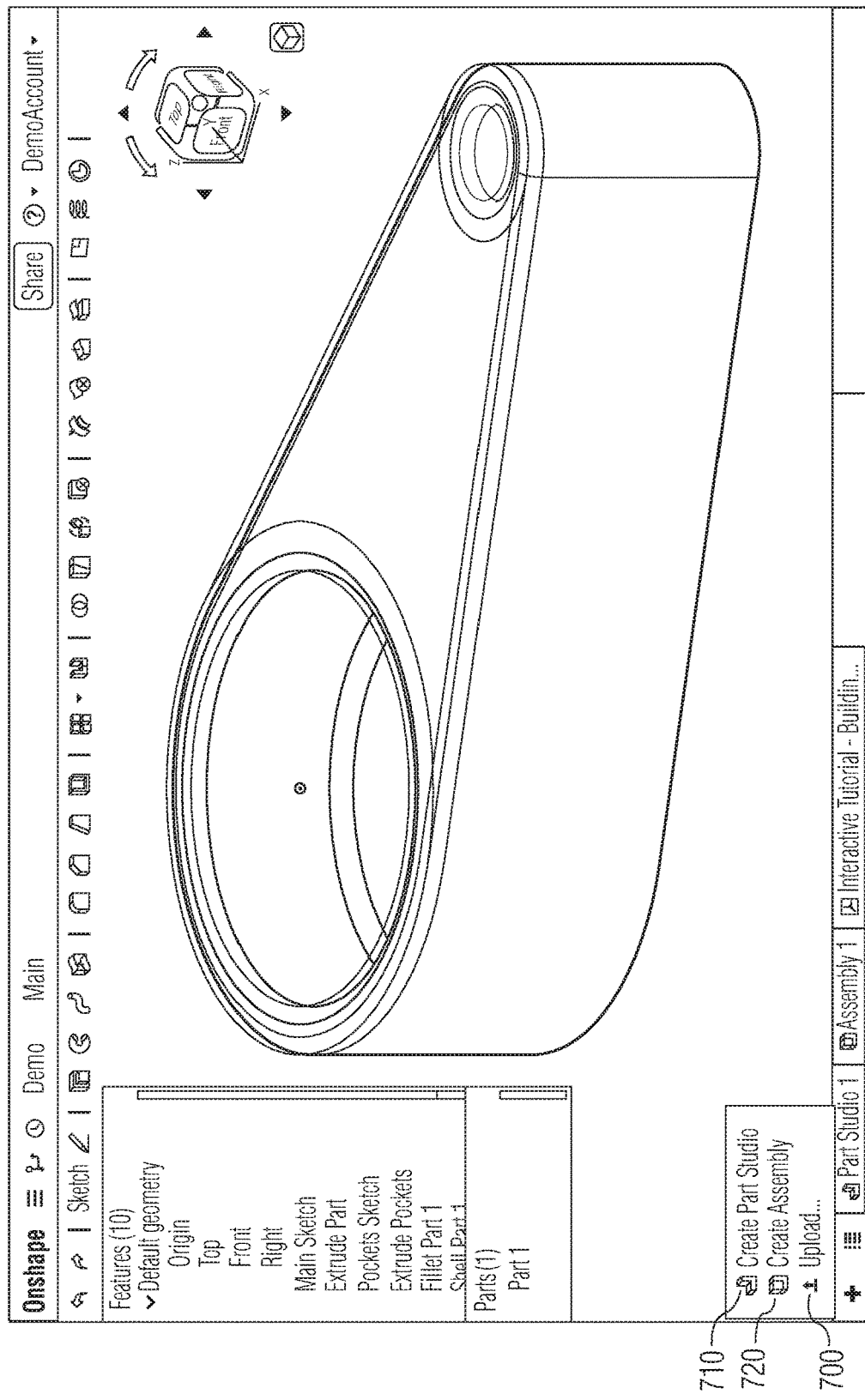
FIG. 7 is an upload screenshot.

Upload allows uploading any type of file from a location in local storage, network storage, or cloud services such as Dropbox or Google Drive, that is addressable by the client device, into the system, stored within a project by the DPS. Uploaded files may be stored into an existing project, or into a newly created project. How the system handles an upload depends upon where the upload was initiated. If initiated from the Projects overview, the upload creates a new Project with appropriate tabs. Also referring to FIG. 7, if initiated from inside a Project, or to a specific Project, usually a new tab specific to the type of file upload is created within the Project. Every file uploaded 700 into a project usually becomes its own tab, named with the original file name. If the file is a CAD file, appropriate Part Studio, Drawing and/or Assembly tabs for that CAD file may also be created via CAD data translation by the system. Any type of file can be uploaded into the system, although file types not understood by the system may lack functionality or display capability within the client. In addition to uploading existing files, new and blank part studio 710 and assembly 720 tabs may be created.

Figure 8:
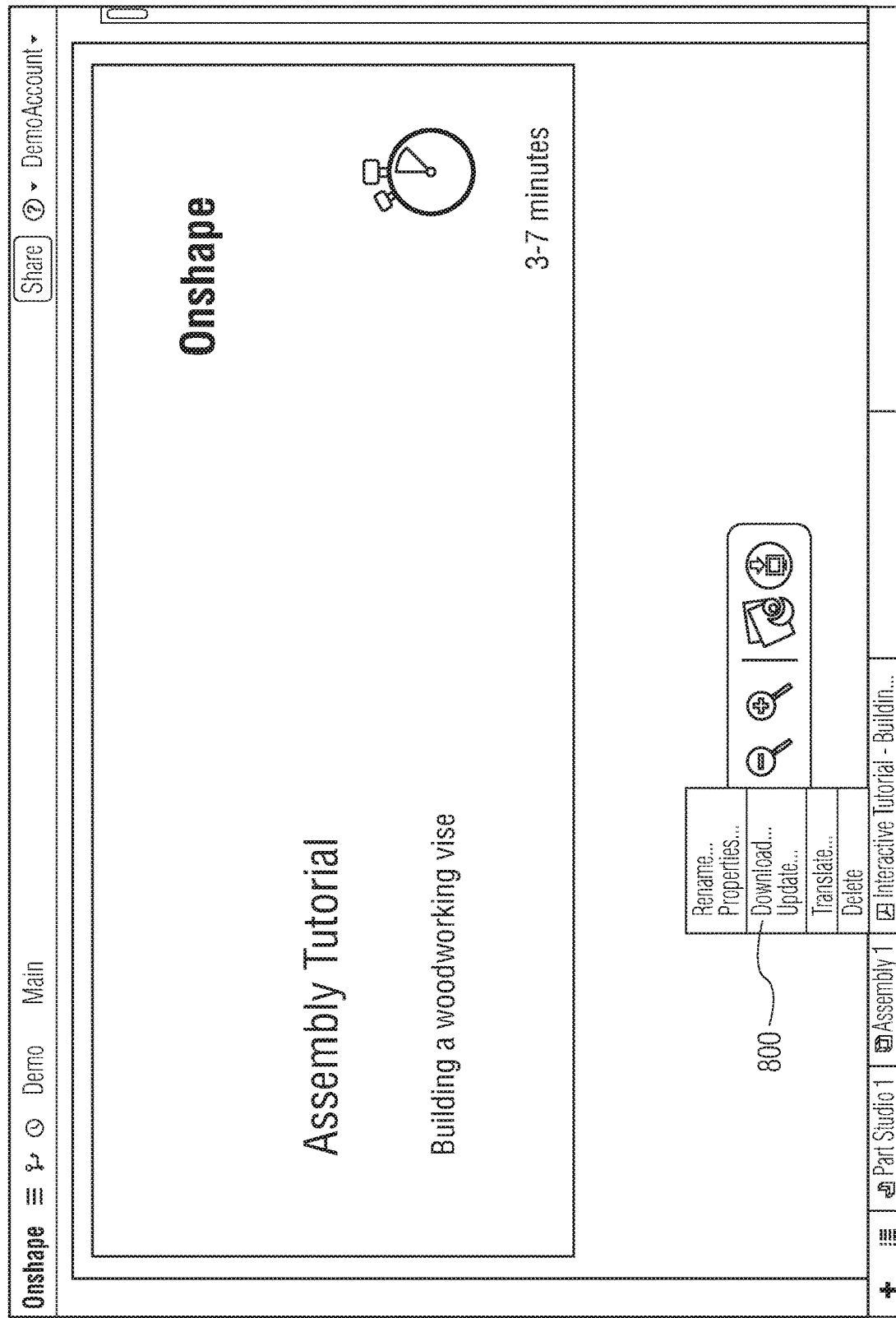
FIG. 8 is a download screenshot.

Download copies any file that was previously uploaded into a project back out in its current file format to a storage destination addressable by the client device. Also referring to FIG. 8, downloads 800 can be initiated through context menus of tabs within projects, and are available for any tab that can be represented as a file.

Figure 9:
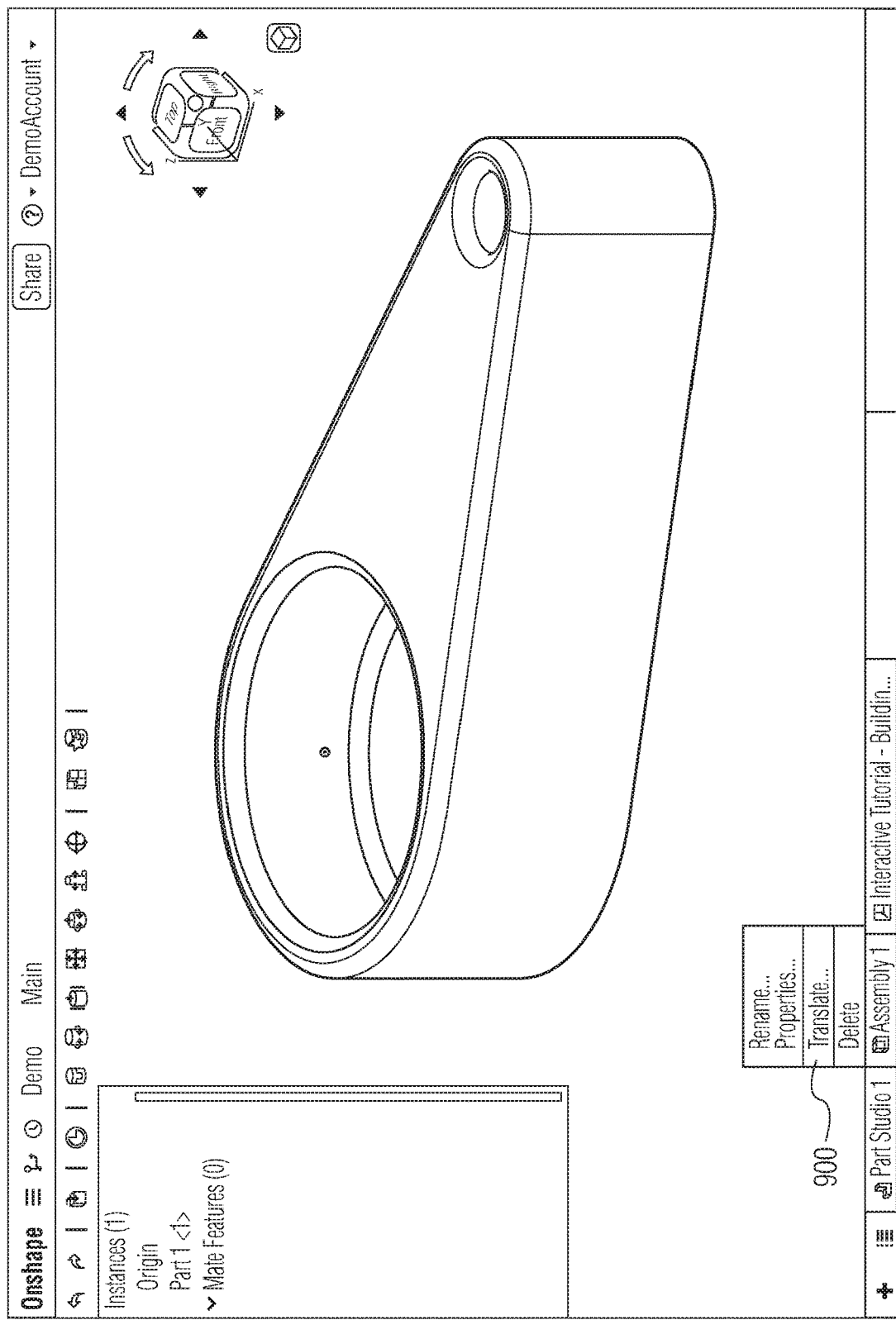
FIG. 9 is a translate screenshot.

Also referring to FIG. 9, translate 900 allows converting a part studio, drawing or assembly file into a different format, and displays as a new tab within a project. Translate may apply to any default tabs (Part Studios or Assemblies) as well as any uploaded CAD files. Some example translatable formats include, but are not limited to, Parasolid, ACIS, STEP, IGES, CATIA v5, SolidWorks, Inventor, Pro/ENGINEER, CREO, and JT. When a CAD file is uploaded as a new Project, processing options are automatically presented. When uploaded into an existing project, a translate option may be selected to automate options. When translating a CAD file, options are presented to select from vendor-specific or generic CAD formats, and to specify options such as source orientation. Some three dimensional CAD systems use a "Y Axis Up" coordination system, while others use a "Z Axis Up" system. Additionally, if the file is an assembly, or contains an assembly, another presented option is to translate the file as only a Part Studio, which is selected through a Flatten option. With the Flatten option selected, the assembly is flattened to a set of parts in a Part Studio. Translation and flattening are performed through communication between the client and DMWS, DPS, AMCS, AMBS, and CEWS. Non-native CAD files in a project may also be translated into a native CAD format. This creates a new tab for the translated CAD file, and retains the original non-native CAD file as part of the project (which may be desired for future download in the original format version).

Figure 10:
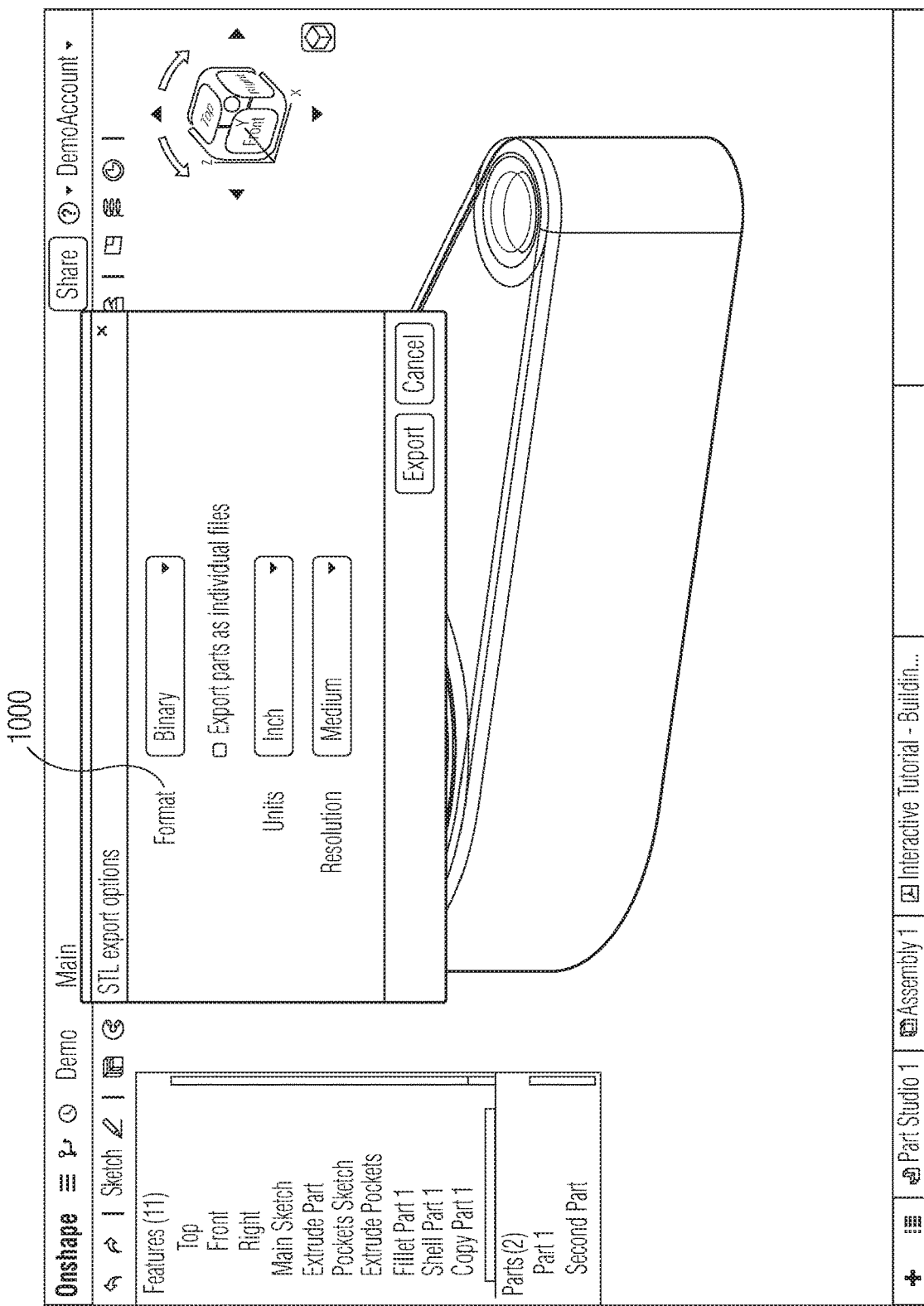
FIG. 10 is an export screenshot.

Export translates a Part Studio (or individual part) to a format, for example STL format, and downloads it to a storage location addressable by the client device. Referring also to FIG. 10, users have the option of exporting either an entire Part Studio or individual parts within a Part Studio to an STL or other type of file 1000.

Editing a Project

Once a project is opened by a client, each tab represents a file within the single compound document of the project. Opening an existing project opens tabs for all files within that project. Creating (and opening) a new project starts the project with a default workspace and default tabs, for example a Part Studio and an Assembly. The tabs may be rearranged (ordered positioning), and this action applies to the workspace (so would also be applied to any other users collaborating on the same workspace). Which tab is currently active, and any positioning/scrolling of the workspace, are user-specific and non-persistent. Therefore each user collaborating on a project workspace has their own active tab and their own tab scroll state. Options for each individual tab, accessible through the user interface, may include renaming the tab, viewing and editing tab properties (such as, but not limited to, description; part number; revision; state of a part), duplicate, copy to clipboard, export to STL, translate, and delete. Duplicate creates a new tab with an exact copy of the duplicated tab, with each of the duplicate tabs being independent. Thus changes in the copy do not impact the original tab. Translate similarly creates a translated copy in a new tab, leaving the original formatting in the previously existing tab.

A project menu, also accessible through the user interface, allows project-wide options such as to rename the project, copy the current workspace, view or change properties (such as default units), print, access versions and/or persistent transaction history, and undo or redo actions.

Metadata

Figure 11:
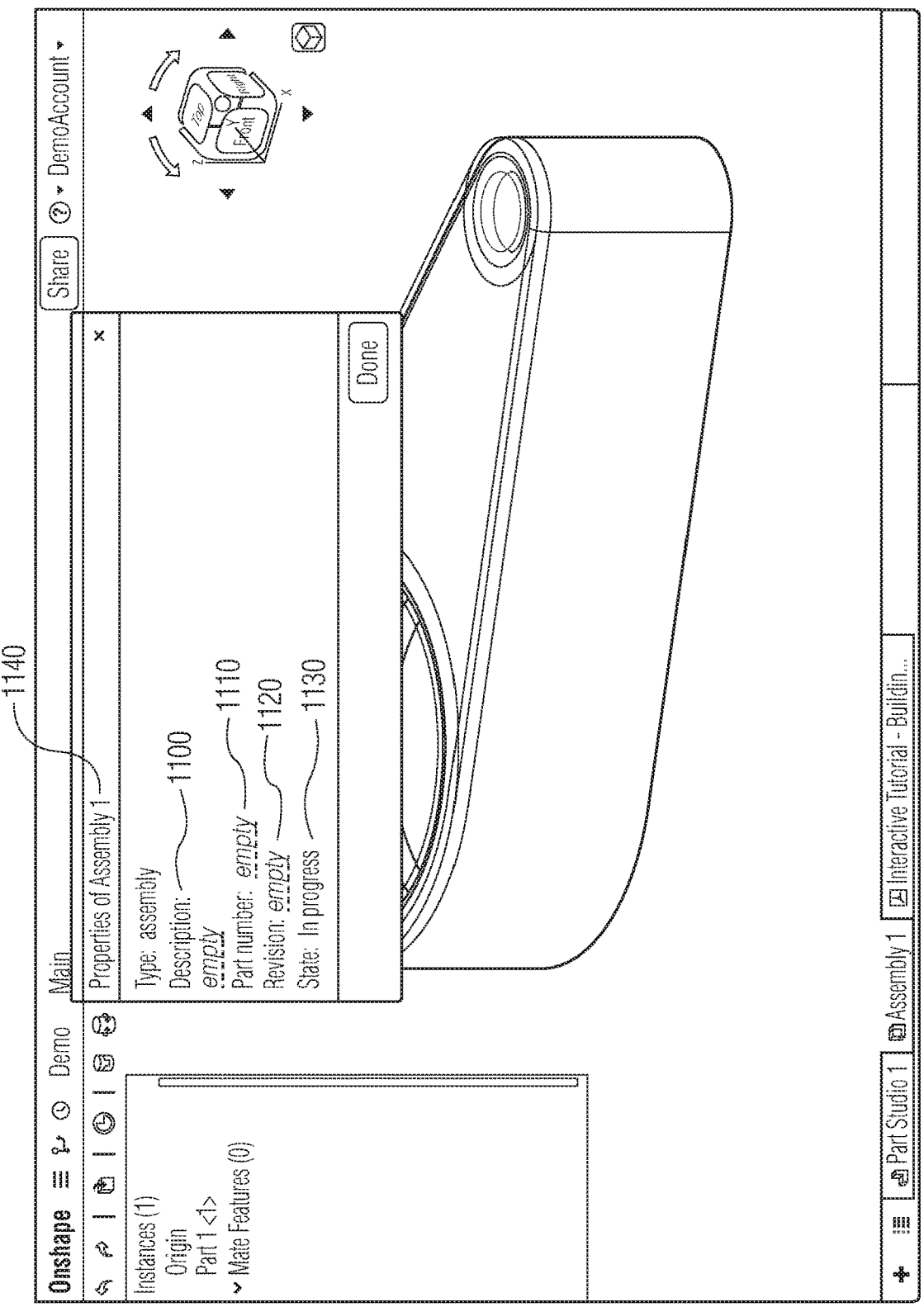
FIG. 11 is a properties screenshot.

The system allows users to create and edit meta data for parts, Part Studios, Assemblies, Drawings and foreign data (non-CAD tabs) in order to support various design processes. Referring also to FIG. 11, metadata may include a description 1100, part number 1110, revision 1120, and state 1130 (in progress, pending, released, or obsolete). Metadata is defined and edited through the Properties dialogs 1140 found on various context menus. Parts metadata may be accessed and edited through a context menu on a part listed within a Part Studio feature list. Part studio metadata, assembly metadata, and foreign data file metadata may be accessed and edited through context menus on individual tabs within a project. Additionally, all types of metadata may be accessed and edited through a properties dialog for a version or workspace accessed through a Version Manager.

Workspace

The user interface workspace for an active project includes a menu bar or user interface control button area, tabs for all files in the project, a graphics area for the active tab, and a feature list. The graphics area displays the active Part Studio, Assembly, or other tab. The feature list has different data depending on the active tab. If a part studio is active, the feature list contains a parametric history of work, and a Rollback bar to view work at a certain point in the parametric history. If an assembly is active, the feature list contains the Assembly tree structure, Mates, Groups, and Mate connectors.

User interface display and interaction with the workspace may vary depending on the client device and input/output capabilities. Typically, selection is done via click (or touch), and may be added to by additional clicks. Click- (or touch-) -and-drag also enables selection of multiple entities. Different group selections may be possible. For example, the direction of drag (and as indicated by a specific color of the selection box) may toggle between selecting all entities entirely within the box, and selecting all entities touched by the box. Additionally, clicking (or touching) something already selected de-selects it.

Figure 12:
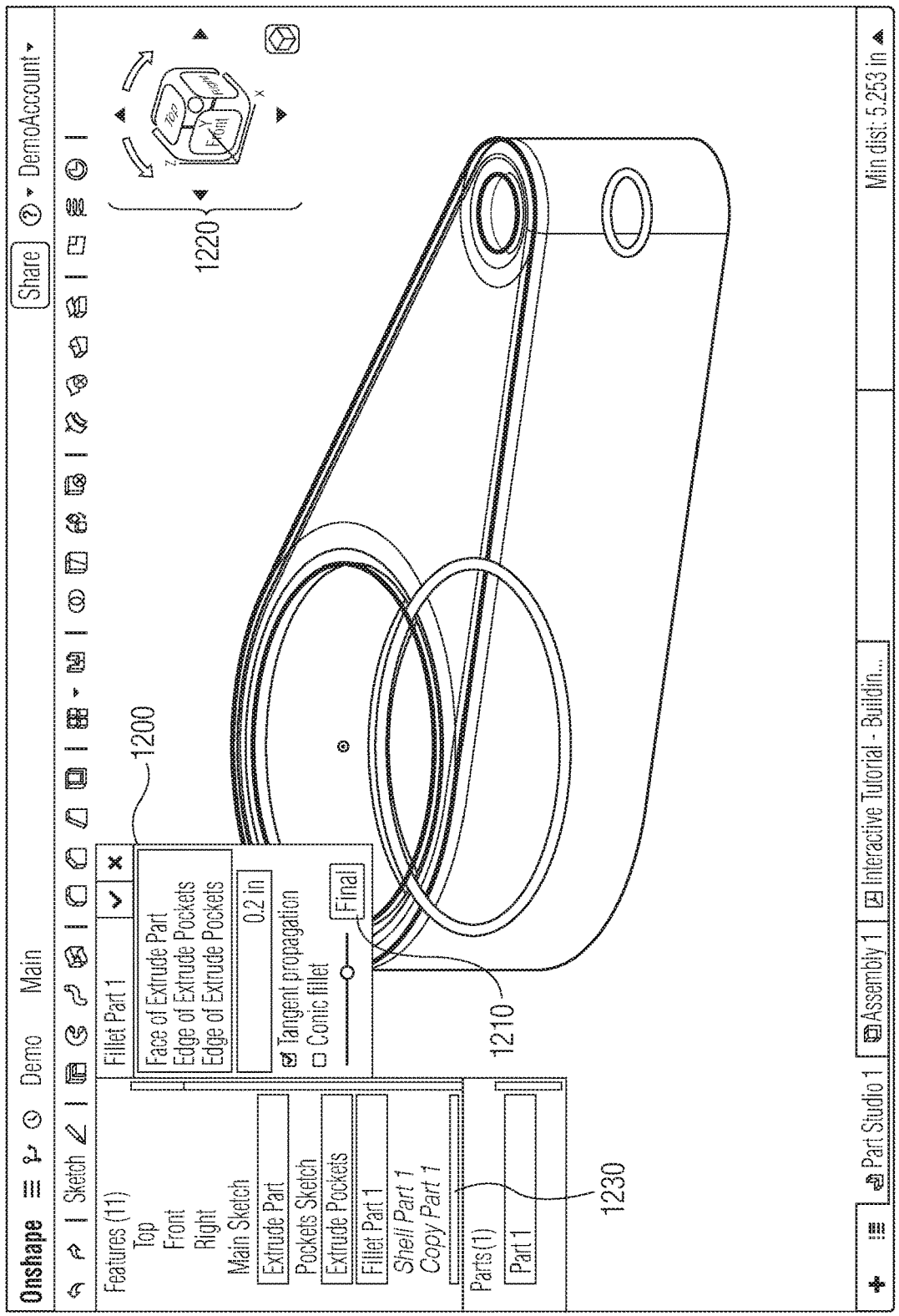
FIG. 12 is an editing dialog screenshot.

Dialog controls are used extensively, and many different aspects of CAD design have different options to configure. Dialogs are accessed through menu selection or right-click in feature list. UI design of the dialogs may identify required selections through highlighting (and selection may be made through the graphic area or feature list). Referring also to FIG. 12, configurable properties in dialogs 1200 may include different aspects, such as units input as part of numeric inputs (which may override default or project unit settings), number input in the form of mathematical expressions (PEMDAS or trigonometric), or global variables and equations. Dialogs may also include a preview slider as detailed in patent application Ser. No. 14/226,042 (Previewing Changes On A Geometric Design, filed Mar. 24, 2014, naming inventors K. Evan Nowak and Michael Lauer), which is fully incorporated by reference herein. When a user edits a feature, by default the model displayed is rolled back to its state when that feature was created, hiding all later features (with features sequentially applied from top-to-bottom as listed in the feature list). The Final button 1210 displays the final result with later features applied while the user is still editing the feature. If editing the last feature, the user interface does not need to display the Final button, as there are no later features to apply.

Graphic Area Controls

Within the graphic area, mouse or touch control may rotate (3D), pan (2D), and zoom the active view. A view cube 1220 may be also displayed, with user interface interaction with the view cube adjusting the active graphic area view. For example, arrows around the cube may rotate the view in any of six directions, selecting a planar face of the view cube may change orientation to the plane, and a dot or other indicator on the cube may auto adjust to an isometric view. A view cube menu may allow further options, such as isometric, dimetric, or trimetric; specific section views; zoom to fit; toggling perspective; controlling shading and edges; and adjusting translucency (transparency may also be set on a per-part basis by changing appearance of selected individual parts).

Error Conditions

As part of dialogs and general user interface design, visible error indicators are displayed in colored text. The most common errors may be determined by 3DGCS or CEWS while editing a part or assembly. For example, when there is a problem with a feature, a user may see that feature in orange text in the Feature list. Hovering over or selecting orange text in the Feature list may further display a summary of the issue. With a dialog active, the dialog title may be colored orange to indicate error. Within the dialog, orange text may identify entities previously input into a dialog box which have been deleted, or may identify error conditions preventing application/operation of the dialog box. When the problem lies with a single field, like an invalid entry in a numeric field, that field may be outlined in red. Similar error indicators may extend to sketching. Color may be used to indicate the constraint status of sketch entities, for example, blue means under-defined, black means well defined, and red means over-defined (over-constrained). With constraints, standard coloring (such as a gray square with a black icon inside) may indicate no error, while color indicators (such as a red square with a white icon) may indicate a problem with a constraint. If a more general system error occurs, a notification may appear in a bubble at the top of the user interface window.

Sketching

Sketching is an editing mode for editing geometric shapes within a specific plane. The results of sketches are features which are used to create parts for an assembly. Sketching is entered while editing parts, and can be used to create geometric shapes which become parts, or modify geometric shapes of existing parts. Some options are the same whether sketching or editing parts and features outside of sketch mode, but sketch mode also allows some sketch-only options. Referring also to FIG. 13, a sketch toolbar 1300 with such options becomes active when creating a new sketch, editing a sketch, or when selecting a sketch option. In all cases, a specific plane is required to orient the view for the sketch. The sketch toolbar contains tools to begin or edit a 2D sketch which is used to create or modify a 3D feature or part.

Some of the sketch options include tools for basic geometric designs. For example, lines 1302, rectangles 1304, polygons 1306, circles 1308, arcs 1310, and splines (multi-point curves) 1312 may be created or edited within the sketch plane. Basic geometry constructs, such as lines, rectangles, and circles, may be created by user interface interactions directly in the graphics area, such as by selection or drag actions to set any endpoints, vertices, or curve control points. More complex tools may also have dialogs to set any required input or configuration (such as number of sides for a polygon). Construction 1314 allows creating new geometric constructions or converting existing entities into a geometric construction. Additional tools may modify existing geometries. For example, use 1316 or convert may project (or convert) one or more edges of parts onto the active sketch plane. Fillet 1318 may create fillets (rounds) along one or more lines, arcs, and splines. Trim 1320 may restrict a curve extension, and extend 1322 may stretch a line or arc, to a first intersecting point or bounding geometry. Offset 1324 may shift a curve or loop a specified distance and direction from the original. Mirror 1326 may copy one or more entities in the sketch plane, and mirror them across a selected line. Dimension 1328 may add horizontal, vertical, shortest distance, angular, or radial dimensions to sketch geometry. Additional options allow constraints between multiple geometric entities, thereby controlling shape and/or positioning. For example, coincident 1330 makes two or more entities (lines, curves, or points) coincident. Concentric 1332 makes two or more circles or arcs share a common center point. Parallel 1334 makes two or more lines parallel. Tangent 1336 forms a tangent relation between two or more curves. Horizontal 1338 makes one or more lines, or sets of points, horizontal within the sketch plane. Vertical 1340 makes one or more lines, or sets of points, vertical within the sketch plane. Perpendicular 1342 forms a right angle between two lines. Equal 1344 makes two or more curves of the same type equal in size. Normal 1346 positions a line to be on a normal to a curve. Fix 1348 grounds a sketch entity on the sketch plane. To aid in positioning and constraints, point 1350 may create points anywhere on a sketch entity, allowing constraints to be fixed to such point. For positioning control, midpoint 1352 constrains a point to the midpoint of a line or arc. Some of the tool options create points or constraints by default. For example, when fillet rounds multiple lines, arcs, or splines, it adds (or retains) a coincident constraint to keep the lines, arcs, or splines together. Similarly, common points are automatically created with geometric entities (such at vertices, ends of lines, and centers). These points may be used in constraining geometric entities. Constraints are only displayable and modifiable while in sketch mode, and may be displayed with icons and colors through the user interface. Error conditions with constraints can also be displayed, for example, blue color may indicate under-constrained (more constraints possible on a geometric entity), black color may indicate fully constrained (no errors, but no alterations possible due to the current constraints on a geometric entity), and red color may indicate over-constrained (more constraints exist than can be resolved into a valid geometric entity).

While sketching, inferencing occurs to guess at likely constraints, display indication of such guess, and automatically create the constraints if appropriate based on user input. One example of this is horizontal or vertical alignment—when creating or moving an entity, such as a line, if approximately horizontal or linear to another entity, such as the point of origin, positioning can automatically be made in vertical or horizontal alignment. This automatic adjustment may be triggered by user action, such as by holding a user interface element in one spot for a period of time to indicate alignment is desired, disabled by user action, such as holding a modifier to prevent any automatic inferencing, and visually indicated within the interface, such as displaying dashed lines to indicate alignment and inferenced constraint.

Inferencing

When sketching, a user often wants geometry to be related to other geometry in a persistent way. Such relationships can be added after the geometry is created. However, it is much more efficient for the user to create such relationships dynamically, while creating the geometry. Such dynamic constraints are often called inferences or snaps because the visual appearance is that the geometry being created visually snaps to existing geometry.

To perform the needed inferencing, the system performs all the complex intersections and other geometric calculations on the 3DGCS, freeing the client from such work.

etry, resulting in instant inferencing, but even when waiting for server response the client-side user experience is seamless.

When a user begins sketching, the client asks CEWS for any inferences specific to the entity being drawn. Regardless of server response, the client continues to update the displayed sketch based on user input control (e.g., mouse control). Before server response, such client updates occur without performing any snapping (no inferences yet to snap to). When CEWS returns inference information, the client checks the inference zones to find any nearby inference, visually snaps geometries to matching inferences, and displays to the user that a snap has been successful. When geometry has snapped to an inference, the system adds corresponding constraint(s) from the inference to the sketch. Table 1 below outlines the client and server interactions for the case of creating a point.

TABLE 1

| Client | CEWS & 3DGCS |
| --- | --- |
| Receive user command to start point creation<br>To server: Start inferencing (type: point)<br>Repeatedly:<br>Process user input, such as moving the<br>mouse | Calculate inferences to sketch and model geometry<br>and intersect non-point inferences to produce<br>compound inferences<br>To client: Send calculated inference |
| Receive inference and updated WebGL inference<br>buffer<br>Repeatedly:<br>Process user input, such as moving the<br>mouse.<br>Interrogate the WebGL inference buffer.<br>If an inference is found adjust the displayed<br>position and display cues, indicating which inference<br>was found<br>User places the point To server: Create a point at a<br>location. If a snap was in effect send the inference<br>back to the server. | |
| | Received point creation command from client:<br>Create the point<br>If an inference was also supplied then use<br>the data within the inference to create the constraint |

While inferencing is being calculated server-side, the client allows sketching to continue, even while waiting for any server-side results. To incorporate 3DGCS calculated inferences and geometric changes seamlessly at the client, WebGL is used to process inferences. This results in optimizations both client-side and server-side while mitigating the communication time by providing a continuous user experience on the client while the server is working.

Figure 14:
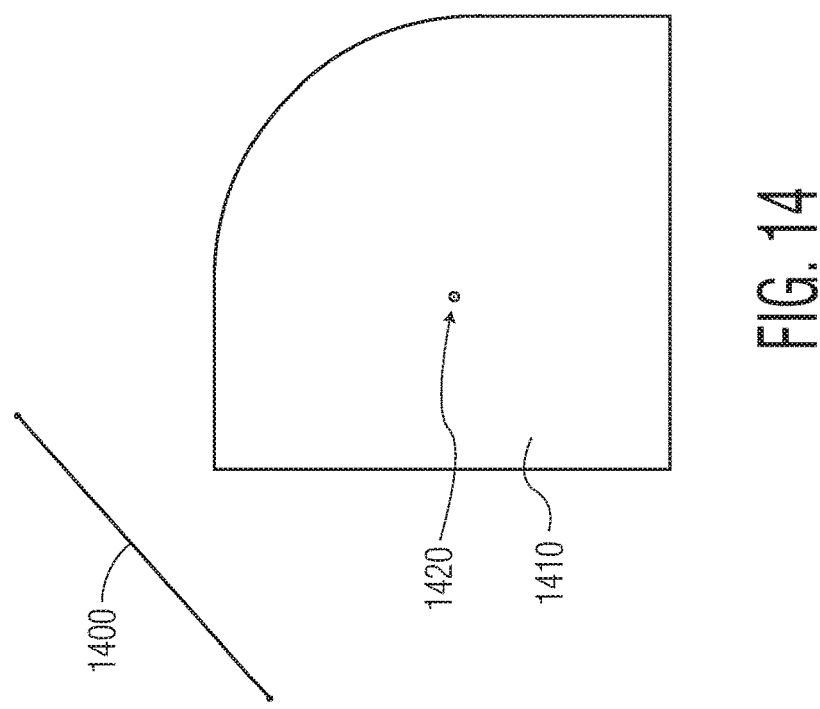

To start inferencing, the client sends a request to calculate inference targets. While waiting for the data from the server (3DGCS via CEWS), the client provides user interface functionality to the user, enabling continuing geometric edits but not displaying any inferencing. When 3DGCS computes inference targets, they are returned to the client and rendered to an off-screen graphical buffer in WebGL. The inferences are returned as an object containing an index to identify the individual inference, an identity of an inference source (for example, a model edge), one or more types of constraints applicable to the inference, and an inference zone which provides a geometrical description of an area that will snap to the inference (for example, a point or a line). Client-side comparison between the inference zones of inference targets in the WebGL buffer and user interface interaction may determine which, if any, inferences should be displayed to the user. Often the server responds before the user has reached the location at which he wishes to place the geom- This inferencing model applies to constraints inferred between any geometric operation or creation, with point creation illustrated as the clearest example to follow. Referring also to FIG. 14, a sketch may appear to a user with a model face 1410 and already drawn line 1400. Also visible to the user is global model origin 1420. When the user enters a "point" command, the client asks the CEWS to generate a list of inferences. This is needed as the client doesn't have all the information needed to generate inference data. Sending all of that information to the client, and performing the mathematical calculations on the client, requires time and computational power likely to introduce unacceptably large delays in the response of the client.

Figure 15:
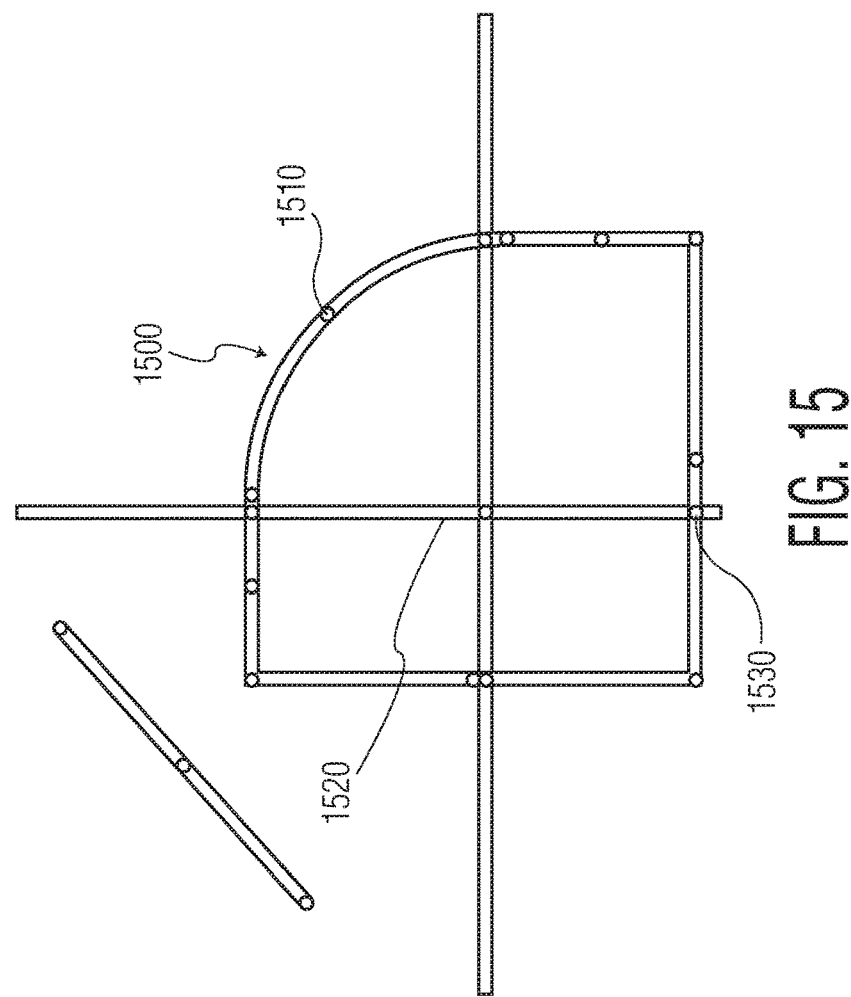

While the server is generating the inference, the client processes user input. When the client receives response from the server, it processes that information to generate a selection buffer in WebGL. The use of WebGL to perform inference picking is significantly more efficient than iterating through all of the inference data and performing mathematical operations to find a match because graphics hardware is very good at processing a lot of data in parallel. Referring also to FIG. 15, a visualization of the geometry is drawn into the WebGL inference buffer. Four inferences are highlighted in the figure, including coincident to edge 1500, midpoint of edge 1510, and vertical to origin 1520. In addition, it is often useful to snap to compound inferences.

Compound inference 1530 is a combination of a coincident inference to the edge and a vertical inference to the origin. By separating inference calculation from the client, and continuing client operation during inference calculation, the server is able to calculate the (many) necessary intersections without affecting the client experience. For every inference in the inference buffer, the client decides a snap tolerance and renders a stripe or dot that incorporates this tolerance. Once this buffer is drawn it can be sampled at the position of interest.

If an inference is found at a position indicated by the user, the client uses the inference data to determine how to appropriately notify the user of the snap (e.g., by highlighting the source of the inference and displaying an indicator showing the type of inference) and modifies the position of the point to conform to the snap. Referring also to FIG. 16, a newly created point is snapped to the coincident inference and indicated to the user through highlighting the inference source 1600 and display coincidence indicator 1610.

When the user places the point, the client asks the CEWS to create the point. If the client is currently snapping to an inference, the client also passes that inference to the server. When the CEWS receives the data, it creates the point and any constraints related to the passed inferences.

This communication between client and CEWS is done as a conversation. The client asks for the most immediately useful inferences. As the user mouses over or otherwise moves model geometry or view of the geometry, the client asks for additional inferences related to that geometry. This conversation minimizes the amount of calculations required without adversely affecting the user experience. By updating the WebGL inference buffer asynchronously on the server only when necessary (for example when model geometry is changed) and much less frequently than inferences occur (which usually happen locally entirely on the client), the user experience is optimized.

Predictive Drag

Figure 17:
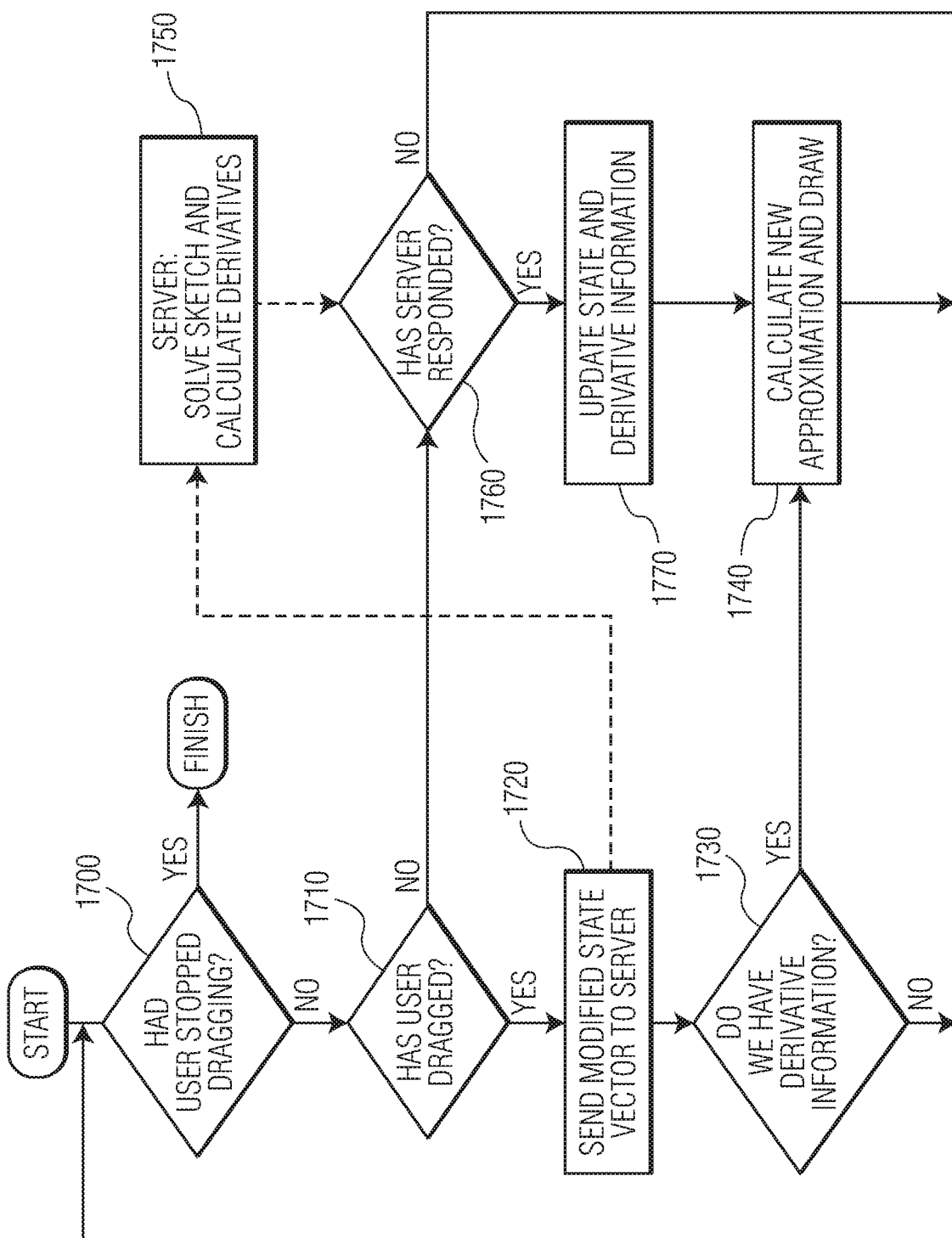
FIG. 17 is a flowchart detailing predictive drag.

As with inferencing, if the client waits for server calculations while modifying any geometric model noticeable delays may impact user experience. To avoid such delays, the client may implement a predictive drag which estimates resulting geometries as user interface movements (dragging geometries via a mouse or touch control) are made. To enable such estimation, data is created by the 3DGCS and CEWS which can be used as drag information by the client. This drag information consists of two parts: data that indicates certain ways in which the geometry is constrained to move (degrees of freedom) and approximate derivatives of a solution function. The 3DGCS runs a complete solution function when solving geometries after client changes, but this includes complex calculations beyond the scope of the client. The derivative functions provide a less complex approximation capable of being efficiently run by the client. The client, in turn, applies the drag information constraints and derivate functions to approximate sketch solutions, thereby updating the sketch in real time as users geometrically drag elements in the sketch. Asynchronous communications between the client and CEWS allows updating the sketch shown on the client as it is solved server-side, and also updating drag information appropriate which accounts for any made changes. Referring also to FIG. 17, a flowchart illustrates the logic and client-server interaction as a user drags geometry in a sketch. If a user is not dragging 1700, then no new dragging update requests are made to the server. When a user makes a dragging action 1710 in the sketch, the client sends 1720 a modified state vector to the server. If the client has derivate functions 1730, it locally calculates and updates 1740 the graphical display using the derivative functions. The server, upon receipt of a modified state vector, solves 1750 the sketch and also calculates new derivative functions based on the newly solved sketch. When the new sketch and derivative functions are received 1760 by the client, the locally tracked state and derivative functions are updated 1770 and the current display redrawn 1740 with the server-solved sketch.

When solving the geometries of a sketch, through user dragging or other geometric changes, a solver recalculates the positions of all geometry to satisfy any constraints configured within a sketch. Typically the set of constraints is complex (and grow more complex and involved the larger and more complicated the sketch), and the calculations can take noticeable time to complete even when solved on a high-powered server. Each geometry is represented by a vector of numbers. The vectors for a sketch can be concatenated into a single state vector, which can be denoted as $\underline{x}=[x_1, x_2, \ldots, x_n]$, a vector of n numbers. The solver can be represented as a function f that produces a new vector $\underline{x}$ that satisfies the constraints.

The client, given this vector $\underline{x}$, displays the solved sketch geometry to the user. A simple algorithm would involve the client making changes to $\underline{x}$, sending the changes to the server, waiting for a response from the server with a new $\underline{x}$, and updating the display to show the solved sketch geometry of the new $\underline{x}$. With any kind of complexity in solving for the new $\underline{x}$, the client appears sluggish with time waiting for the update. To avoid such waiting behavior, the 3DGCS uses finite differences to calculate approximate derivatives of the function f. The derivatives of f with respect to $x_i$ may be represented as $df/dx_i$. The derivative $df/dx_i$ may be calculated by first finding a suitable delta, h, which is related to the size of the sketch. Then $df/dx_i=[f([x_0, x_i+h, \ldots x_n])-f([x_0, \ldots x_i-h, \ldots x_n])]/2h$.

Given a state vector x and the derivatives at $\underline{x}$, df/dx, then client calculates an approximation of the solve function f at any other vector $\underline{y}$ by calculating $\underline{y}'=\underline{x}+(\underline{y}-\underline{x})$ df/dx. This may be used by the client to estimate any geometry solves while actively modifying the sketch by the user, thereby avoiding any delays in waiting on the server.

On the client side:
dfdx:=undefined
x:=sketch state vector
approx:=x
do
  do
    y:=new state vector modified by user drag
    send y to server
    if dfdx is defined then set approx:=x+(y−x)*dfdx
    draw approx
  until server response received or user stops dragging
  if server response received
    set x:=new state vector from server
    set dfdx:=new derivatives from server
until user stops dragging
On the server side:
when drag is received from client
  calculate new sketch state vector
  calculate derivatives with respect to coordinates being changed by the user
  send new sketch state and derivatives to the client This derivative approximation process may also be improved with an additional step to use of degrees of freedom information, which may be calculated by 3DGCS when calculating the sketch state vector. Degrees of freedom information constrains the movement of a dragged entity in a manner easily enforced by the client. As an example of such constrained movement, if a point is constrained to lie on a fixed circle then the client can enforce that constraint before sending the change to the server, and before calculating the approximation. This reduces variance in many cases.

The system can monitor, either entirely by the client or by the server tracking timestamp data provided by the client, the time required (delay time) from the client request through receipt of a complete solution from the server. A large delay time may be caused by a complex sketch or by a poor internet connection. In large delay time situations, the system may enable use of predictive drag dynamically to improve the user experience. A system wide setting may be configured, or individual settings configurable at a user account level, to establish a minimum delay time which, if exceeded, triggers enabling use of predictive drag. If already enable, dropping below the minimum delay time would trigger disabling use of predictive drag. This dynamic enablement/disablement improves the user experience, by allowing continued local graphical operation and updating through use of predictive drag when delay time is large, and reducing extraneous graphical operation and updating by disabling predictive drag when delay time is minimal.

Part Studio

A Part Studio tab is used to define parts and has a feature list (parametric history). Regenerating the feature list produces Parts. The feature list drives the shape of multiple parts. Each part can be instanced multiple times in assemblies and each instance can move independently in the assembly. There are two main design tool aspects to the part studio: sketch tools and feature tools. Because a Part Studio allows multiple parts to be defined with one feature list, the user can design in a very productive top-down manner.

Feature Tools are used to create parts through manipulation of various features. The feature list includes entries referencing the origin and planes 640, entries referencing created features 642, a rollback bar 1230, and entries referencing parts 644. Created features are geometric operations (for example, but not limited to, a sketch or an extrusion) and the specific data associated with that operation. Selecting any entry in the feature list accesses user interface options to hide or show the selection within the graphics area, to suppress or unsuppress a feature (which visualizes the model with or without the feature being included), or to highlight the equivalent visuals in the graphics area. The feature list is sequentially ordered from top to bottom, so moving positions of features in the feature list reorders the design parametrically, which can alter the resulting design.

Sketch Tools 650 add or modify features in order to alter the displayed design. A specific sketch mode may be entered to orient the graphics area view onto a specific plane or planar surface, and then add or modify geometric shapes, points, and various constraints. Whether or not in sketch mode, various other options are available.

Extrude 652 adds or removes material perpendicular to a selected region, surface, or planar face. A dialog allows configuration of required entities, dimensions, and directions, allowing creation or modification of parts, or intersecting an extrude body with parts. Dimensions may be absolute (a measured and specific distance) or relative, such as up to: a next geometry, a specific surface, or a specific part; or through all parts.

Revolve 654 adds or removes material revolved about a selected sketch planar face or edge. A dialog allows configuration of required entities, dimensions, and directions to add a surface from edges or curves or create, add to, remove from, or intersect one or more solids. End conditions may be set such as a full revolution (360 degrees around a selected axis), in one direction for a specified angle, symmetrically in two directions for a specified angle, or in two directions at specified angles for each direction.

Sweep 656 adds or removes material along a specified set of connected curves. A dialog allows configuration of required entities, dimensions, and directions to add a surface or create, add to, or remove material from parts.

Fillet 658 rounds sharp edges to create round outside edges and filleted inside edges. A dialog allows configuration of required entities and dimensions to apply a standard, circular-shaped, constant radius fillet or a more stylized conic fillet. Required aspects include a specific edge or face of a part (which may apply to all edges of the face) and a radius value. Alternative options include tangent propagation (to automatically extend the fillet to tangent edges) or conic to apply a rho value for a more stylized fillet (allowing parabolic, elliptical, and hyperbolic curves).

Chamfer 660 applies a bevel feature to edges of a part. A dialog allows configuration of required entities (such as edges or faces) and dimensions (such as width for the chamfer). An optional tangent propagation may extend the selection along surrounding edges.

Draft 662 applies a taper to one or more selected faces in order to, for example, facilitate pulling a part from a mold. A dialog allows configuration of required entities (face of a part to act as a neutral plane), dimensions (degree of draft), and direction. An optional tangent propagation allows applying the draft to all tangent faces.

Shell 664 creates a thin-shelled part from a solid part by removing one or more faces and thickening the rest. A dialog allows configuration of required entities (one of more faces of a part to remove), and and dimensions (thickness for remaining walls after removing the selected faces and hollowing out the rest of the part). An additional option allows selecting whether to create the shell wall by using the part face as the inside of the shell or the outside of the shell.

Pattern 666 allows replication of selected parts or faces. Linear patterns replicate in a row or grid, and circular patterns replicate around an axis. A dialog allows configuration of required entities (one or more parts or faces to replicate, and edge or face along or around which to replicate), dimensions (distance or degrees between repetitions and numbers of repetitions), and direction.

Mirror 668 allows mirroring one or more selected parts about a plane or planar face. A dialog allows selection of the parts to mirror and the plane or planar face. The created mirror parts are new parts independent of the original parts being mirrored.

Boolean 670 allows merging, differencing, or intersecting parts. A dialog allows configuration of required entities (parts) and operation. Union merges parts together, subtract spatially differences parts, and intersect removes material except where selected parts intersect. With the subtract option, an additional choice (keep) enables keeping the subtracted parts, which is useful when creating fitted parts.

Split 672 enables splitting an existing part into new parts. A dialog allows selection of the part to split and a plane or surface along which to split the part.

Transform 674 allows moving a part. A dialog allows selecting the part, type of move related entities or dimensions, and optionally retaining a separate copy of the part at the original location. Type of move may be by entity (moving based on another edge), by distance, by specific axis values (in x, y, z coordinates), or rotation about a selected axis.

Copy allows duplicating a part, with the duplicate being a new part independent of the original.

Delete 676 allows deletion of one or more parts. Once a part is deleted, it is removed from the parts list.

If parts are imported without any parametric history, some additional options to directly modify geometries can be useful. Modify fillet 678 allows altering or removing existing fillets. Delete face 680, move face 682, and replace face 684 allow modifying faces of a geometric part.

Plane 686 creates a construction plane, useful for orienting parts or creating new sketches. It can be based on any part, face, orientation, point, or line combination sufficient to define a plane.

Helix 688 uses a conical or cylindrical face to create a helix. A dialog allows configuration of entities (base conical or cylindrical face), dimensions (revolutions or helical pitch), and direction.

Rollback Bar

The model displayed in the graphics area is visualized up to the position of the Rollback bar 1230 in the Feature list. Dragging the Rollback bar to any position in the list visualizes the model at that point and allows inserting new features at that point in the parametric history. Because the feature list is a sequential ordering of features which, when applied in order, creates the current model, dragging the rollback bar to a set position allows regeneration of the model up to the point of the rollback bar. Features below the rollback bar remain listed but not applied as part of the currently displayed model.

Feature List Editing

The Feature list supports parametric history editing operations such as reordering features, deleting features, renaming features, and suppressing or unsuppressing features. It also allows easy access to manipulating the display by hiding and showing parts, sketches and construction geometry and by changing graphical attributes such as color and opacity.

Mate Connectors

Mate connectors are local coordinate system entities located on or between parts and used within a mate to locate and orient part instances with respect to each other. Two part instances are positioned in an assembly by a Mate. The positioning is done by aligning a Mate connector defined on one instance with a Mate connector defined on the other instance. These location of these connectors may be points created when sketching or automatically generated inference points. The orientation of these connectors may be automatically inferenced, for example aligned with the coordinate system of a planar face or axis of a cylinder, or manually positioned. While manipulating a part viewed in the user interface, different inference points display based on the view and area of interest (such as mouse location). User interface controls (such as pressing a shift key) may prevent or change which inference points are displayed. Each face and edge of a part has default inference points at the centroid, midpoints, and corners (vertices). For cylindrical faces, inference points are on the axis of the cylinder and partial cylindrical face.

A dialog allows proper configuration when creating mate connectors. Mate connectors may be created on a part, or midway between two entities. A point is input (selected) to the dialog as part of the mate connector configuration. Further configuration options include alignment (allowing orientation change along a primary and/or secondary axis), movement (move the created connector a specified distance), and rotate (rotate the connector a specified number of degrees). Once created, mate connectors are listed in the Feature list, through which they may be selected for further modification or deletion.

A Mate connector can be created in both the Assembly and the Part Studio. Creating a Mate connector 690 in the Part Studio allows referencing sketch entities, which are available in the Part Studio but not aspects of parts available to assemblies. This allows more possible positions to define a Mate connector within a Part Studio than in an Assembly. Additionally, a mate connector defined in a Part Studio is available for reuse on every instance of that part in every assembly in which it is instanced. When creating a Mate connector in the Part Studio, there is an option in the Mate connector dialog for identifying an Owner Part. This can be particularly beneficial when multiple parts exist within the same Part Studio.

Once created, users can hide or show Mate connectors in both Part Studios and Assemblies. This can be done through context menus available in the Feature list, and set individually or across all mate connectors.

Assembly

The assembly tab is used to define the structure and behavior of an Assembly. Each Assembly has its own Feature list that contains instances (of parts and sub-assemblies), Mates, and Mate Connectors. An instance within an assembly is a reference to either a part defined in a Part Studio, or to a sub-assembly defined in another Assembly tab. Mates are used to position instances and to define how they move. Unlike traditional CAD systems, which typically use low-level assembly constraints to mate assembly entities (and, as a result, positioning two instances usually requires two or three of such constraints), Mates are high-level entities. There is only one Mate between any two instances, and the movement (degrees of freedom) between those two instances is embedded in the Mate. For example, a single Mate can define a pin slot relationship (or any other type of relationship between two instances).

Figure 18:
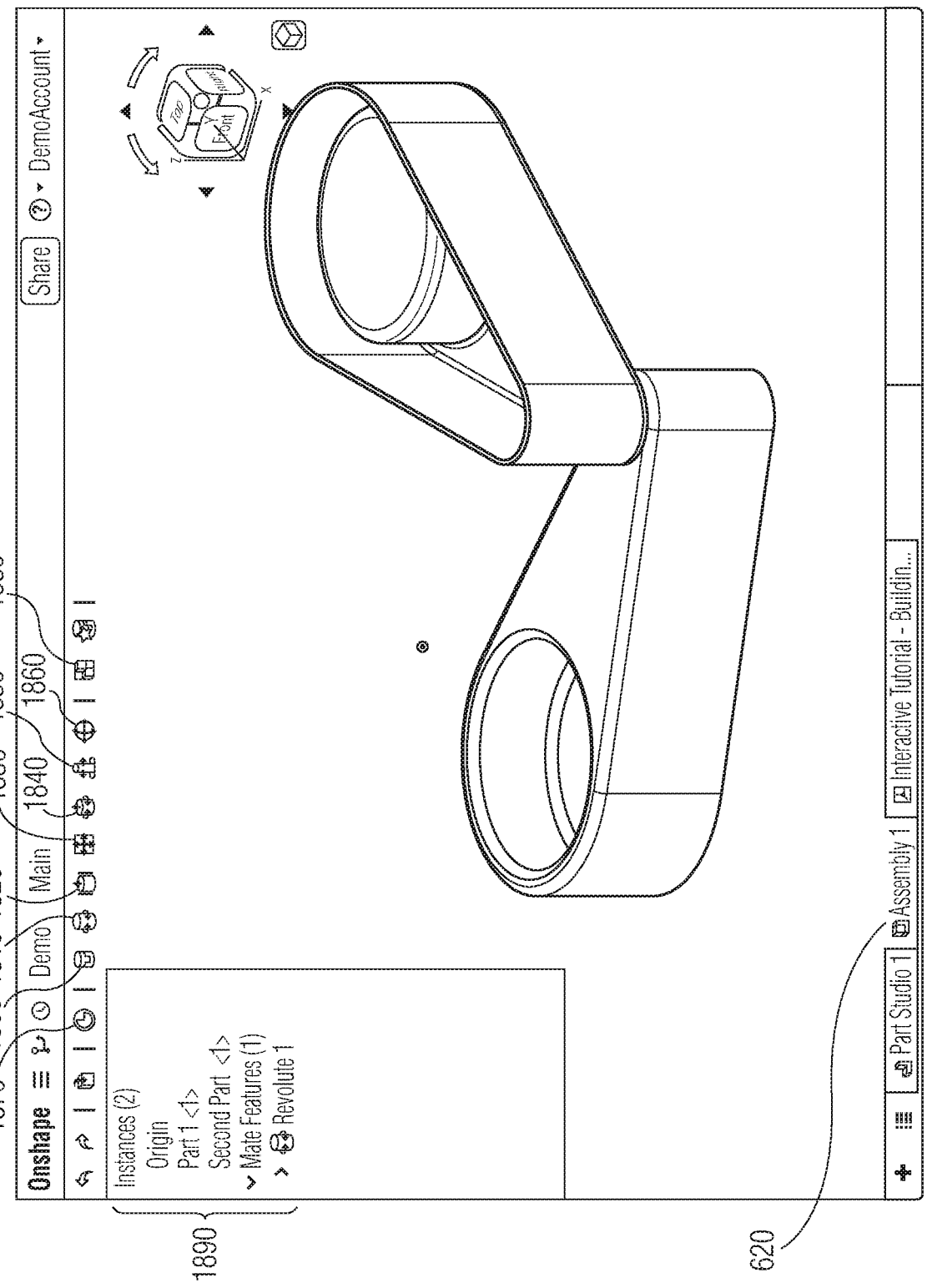
FIG. 18 is an assembly screenshot.

Referring also to FIG. 18, the Assembly tab 620 is used to define and/or modify a hierarchical structure of part and sub-assembly instances which combine into an Assembly. It is also where users define how those instances can move. More than one Assembly tab can exist in a Project, and one assembly can instance one or more other assemblies (as sub-assemblies) and/or instance one or more parts. The basic steps to creating assemblies involve inserting instances of parts and sub-assemblies, creating mate connectors (where the instances connect), and creating mates (how the instances connect).

An insert dialog allows selecting parts and sub-assemblies for inclusion in an assembly. This allows selection of a specific part from a part studio, all parts in a part studio, or an assembly from a different assembly tab. Selection may be through any standard user interface selection technology, such as a search field for named search, or selection from an automatically populated list. An instance of the selection is then inserted into the active assembly tab. User interface interaction with the graphics area may position the inserted instance.

Once an instance is inserted into an Assembly, a user can move the instance through user interface controls. For example, click (or select) and movement may drag the instance (free drag). Another user interface control which may allow moving and repositioning instances around the graphics area, and for movement between instances, is a triad manipulator, which may be activated after selecting an instance to move. With the triad manipulator, a user may reposition the manipulator itself, move the instance along an axis or within the plane, or rotate the instance around the X, Y, or Z axis. When repositioning the manipulator, users can snap it to other entities in the Assembly to redefine the entity's position and orientation.

An instance which is not mated and not fixed will move exactly as a user specifies. An instance which is mated will move as directed within its degrees of freedom. Mates define movement between instances of parts and/or sub-assemblies. Each mate requires two instances, aligned through a mate connector on each, and definition of degrees of freedom (movement) allowed. Any two instances which move in constraint with each other have a single mate to define such movement, and only a single mate is required to define movement between those two instances.

When creating a mate, two instances are aligned based on a mate connector of each. This may result in incorrect orientation of one (or both) instances. A dialog for the mate may allow configuration of orientation, such as flipping a primary axis orientation or adjusting a secondary axis orientation in ninety degree increments. The mate may also be configured for a specific type of mating, which defines movement behavior (degrees of freedom within a standard X, Y, Z three-dimensional system). Fastened mates 1800 remove all degrees of freedom. Revolute mates 1810 allow rotational movement about a single axis. Slider mates 1820 allow translational movement about a single axis. Planar mates 1830 allow translational movement along two axis, and rotational movement along the third axis. Cylindrical mates 1840 allow translational and rotational movement along one axis. Pin slot mates 1850 allow rotational movement about one axis and translational movement along another axis. Ball mates 1860 allow rotational movement about all three axis. Positioning of instances is the same for all mate types (dependent on alignment of mate connectors), and the type of mating may be altered after creation to change the allowed movement between instances.

Mate connectors may be created as an aspect of part creation within a part studio, or created within the assembly as a connector on an instance. Creating mate connectors 1870 within the assembly tab functions the same as creating the mate connector within a part studio, but is more restrictive when created within the assembly tab (cannot access underlying sketch entities for additional mate connector points, and will only be created for the instance within the assembly rather than available for every instance of a part).

In addition to mates with mate connectors, grouping 1880 is possible to fix relative positioning between instances. A dialog allows selection of multiple instances to fix as a group. Once fixed, movement of any instance within the group moves the entire group, keeping the relative positioning fixed. To move an individual instance within a group, a suppress option suppresses the entire group (allowing all instances to move independently), or a specific instance may be removed from the group (making that one instance independent but retaining fixed relative positioning between the other group members). When inserting instances of all parts from a part studio, they may be inserted as a group to automatically retain relative positioning as designed within the part studio. Adding a subassembly instance to a group makes the whole subassembly effectively rigid.

The assembly tab also contains an assembly feature list 1890, listing the instances, mates, groups, and mate connectors of the assembly. A user may select any individual list item in the feature list for modification or editing configuration. If the same part or sub-assembly is inserted multiple times into an assembly, the multiple instances are numbered within the assembly tab for user identification and individual control. Additional assembly feature list controls include hiding or showing any list entry, suppressing or unsuppressing any mate or instance, or "fixing" or "unfixing" an instance to prevent or allow movement of that instance within the assembly graphics area. When features are hidden, they are simply removed from the visual display but still part of the assembly. This can be highly useful in crowded or complicated models. When mates or instances are suppressed, the assembly is regenerated and displayed without the suppressed mates or instances. This can be highly useful to compare with a specific removal before permanently deleting it from the model.

Measuring Tools

Figure 19:
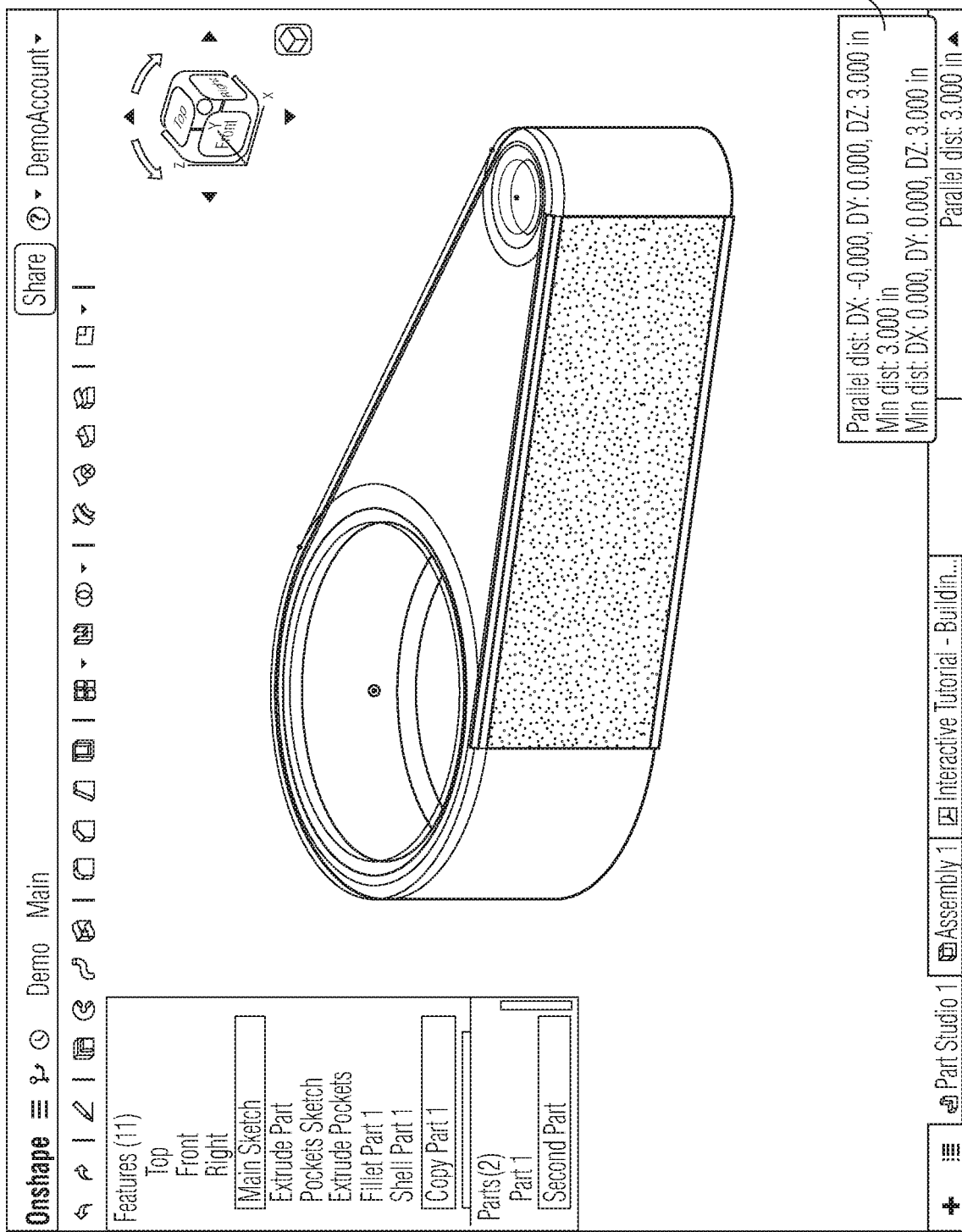
FIG. 19 is a measuring properties screenshot.
Figure 20:
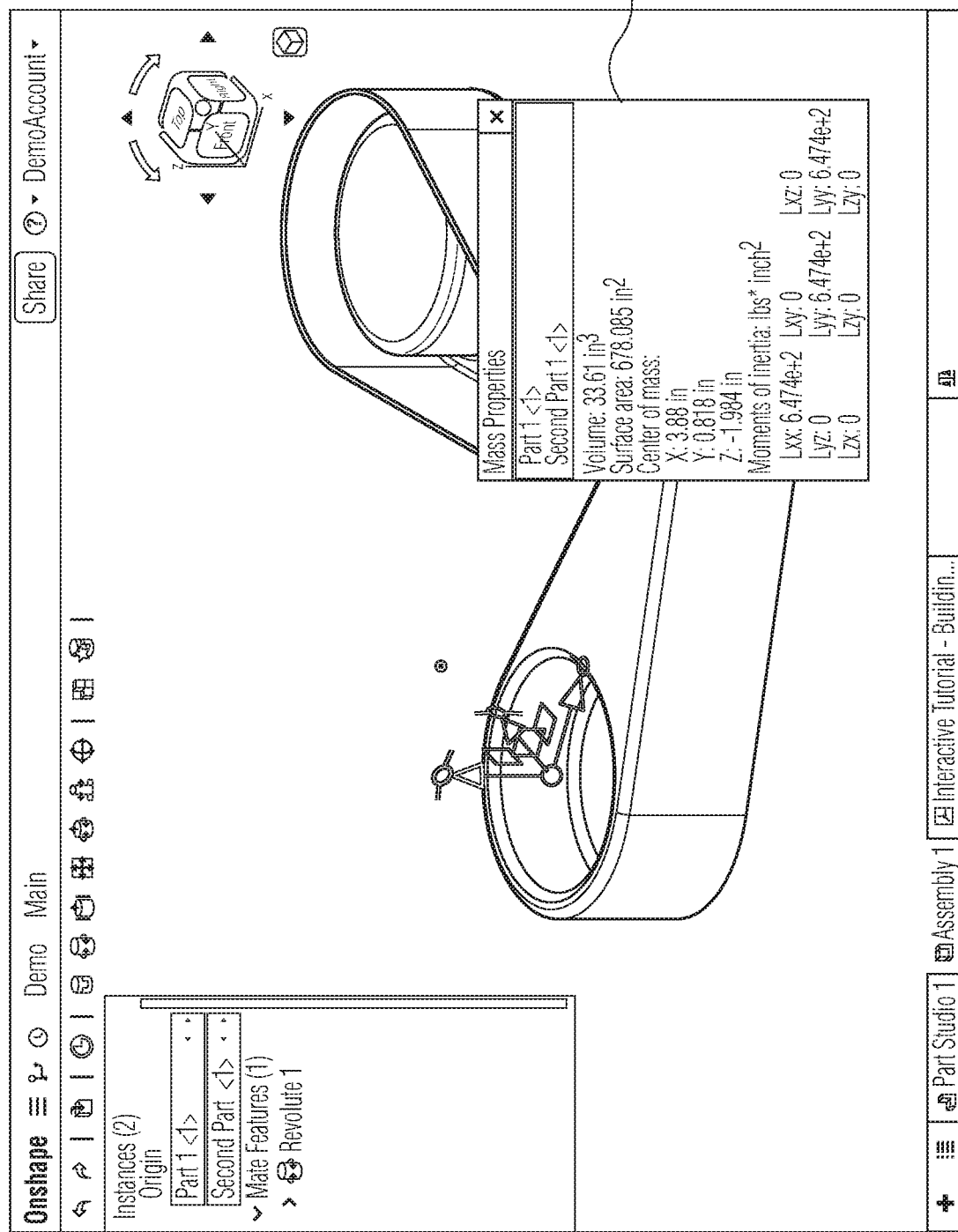
FIG. 20 is a mass properties screenshot.

Within both part studios and assemblies, tools exist to measure dimensions or mass properties. Referring also to FIG. 19, after activating the measure tool, information about selected entities dimensions 1900 is displayed by the user interface. By selecting displayed measurement information, the measurement may also be visualized within the graphics area, such as showing minimum distances between entities as bold dotted lines, changes in various dimensions shown in red, green, or blue, and angles shown as thin dotted lines. Referring also to FIG. 20, after activating the mass properties tool, selected entities are cumulatively added. A dialog allows deleting (or adding) selected entities from the mass properties calculation, and selection of which mass property to calculate. Options to calculate include volume, surface area, center of mass, or moment of inertia (with respect to a common centroid of the selected entities, and assuming density of 1 in units used for the project or using density and other properties of material specifications associated with each of the entities), of the selected entities. For any intersecting parts, properties are calculated for each individual part and then added together. Calculations of properties are done by the 3DGCS and returned to the client for display in a mass properties dialog 2000.

History

While a user works within a project workspace, the DPS automatically records the state of each tab (Part Studio, Assemblies, etc) at each persisted change made to any tab for the workspace. This persistent transaction history is listed in a History of the project. At any time the user can restore all tabs in the currently active workspace to any particular prior point in its History.

Figure 21:
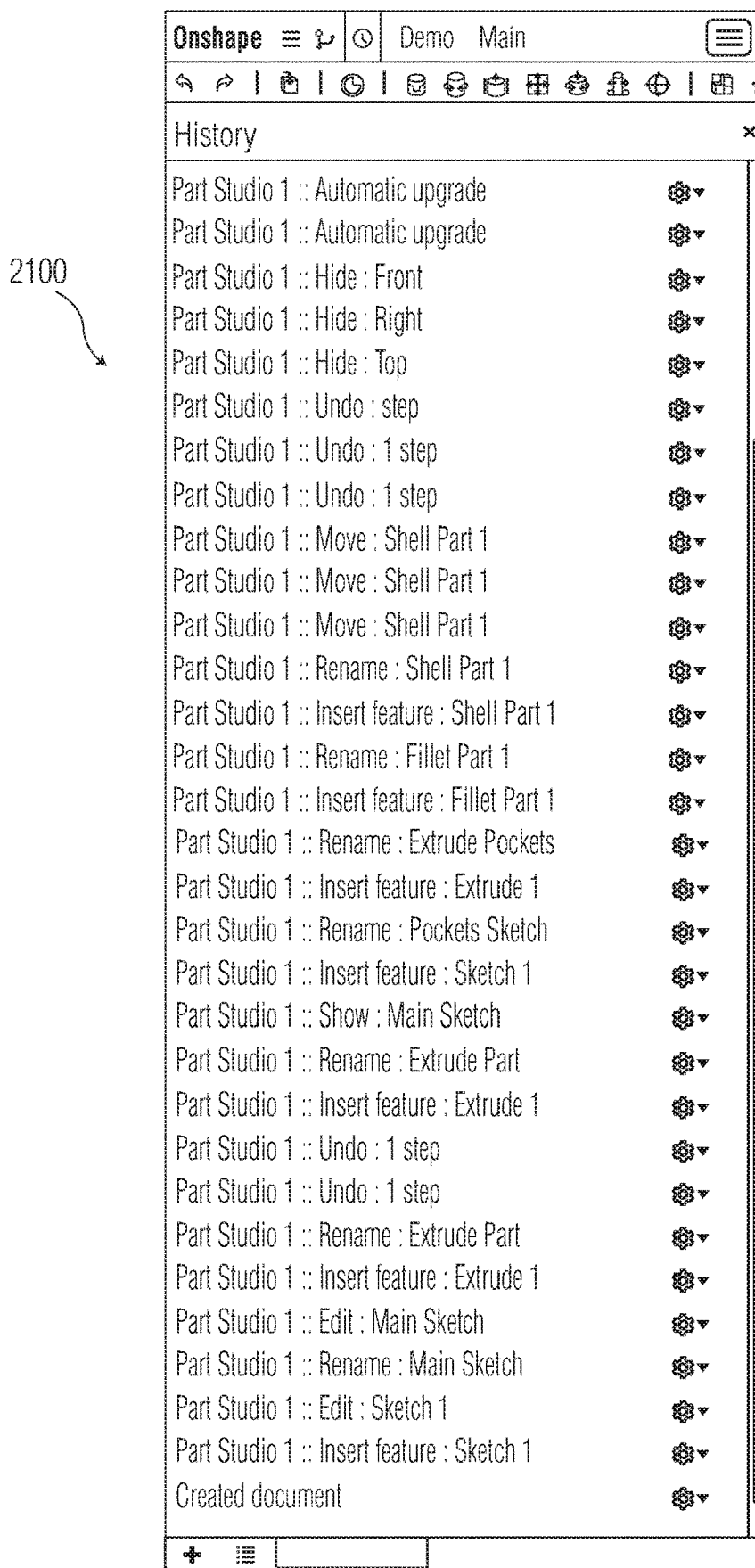
FIG. 21 shows the history.

Every persisted change to a tab in a workspace is recorded in the project's History. Referring also to FIG. 21, records are listed for all tabs in the currently active workspace. The system captures the state of every tab in a workspace every time an edit is completed (by all users working in that workspace). This means that for every project there is an historical record of all states in which it has existed. As a result, users never have to worry about constantly saving their work. Users can always make changes with confidence that if the changes don't work out, they can find and restore any earlier state. In addition, users can use versions, branching, and merging to explore multiple design variations in parallel, either on their own or with other users. Restoring a project to a previous modification state can be used to reverse a design merge made through the Version Manager. The creation of workspaces and the merging of workspaces is also recorded in the persistent transaction history.

The description of a record in the History list 2100 may be in a format such as "Tab-name:Action:Feature-name." Each entry in the History list includes displayable information (either by default or via user interface actions such as on-hover) to see who made the modification and when. Selecting an entry in the History list visualizes the project at that History point (including the feature listed). After visualizing at a particular History point, a Restore option is available to restore the workspace to that particular point. Such Restore action also becomes a record in the project's persistent transaction history.

A project may have many workspaces; one for each branch. At any point in time, a user can save a state of a workspace as immutable, thereby creating a version. A version is a snapshot of a project at a particular point in time. The geometric data (and the accompanying data like Part names, etc.) of that version is unchangeable. This is a very valuable and unique feature. There are many references between parts and assemblies in CAD. In the prior art, these references cross stored named files and are "live". This meant it was very easy to inadvertently change one file and unknowingly modify others. In many cases it is very difficult to know if such a follow-on change occurred and there is often no reasonable way to change one part without changing the referencing part. Such changes often impacted additional files recursively as well; a second part forcing a third part to change, and so on. This is a very serious and costly flaw in the prior art. In the disclosed system, references between projects are always to versions, and versions are immutable. Changes are made to a new workspace above the immutable version. When the workspace is versioned, the user receives a notification, and by taking a specific action, can control whether the to update the referencing project or not.

Users can, however, change the meta data of a version. Users can create many versions of a project. Managing the workflow around versions and workspaces is performed through the Version Manager.

Version Manager

Figure 22:
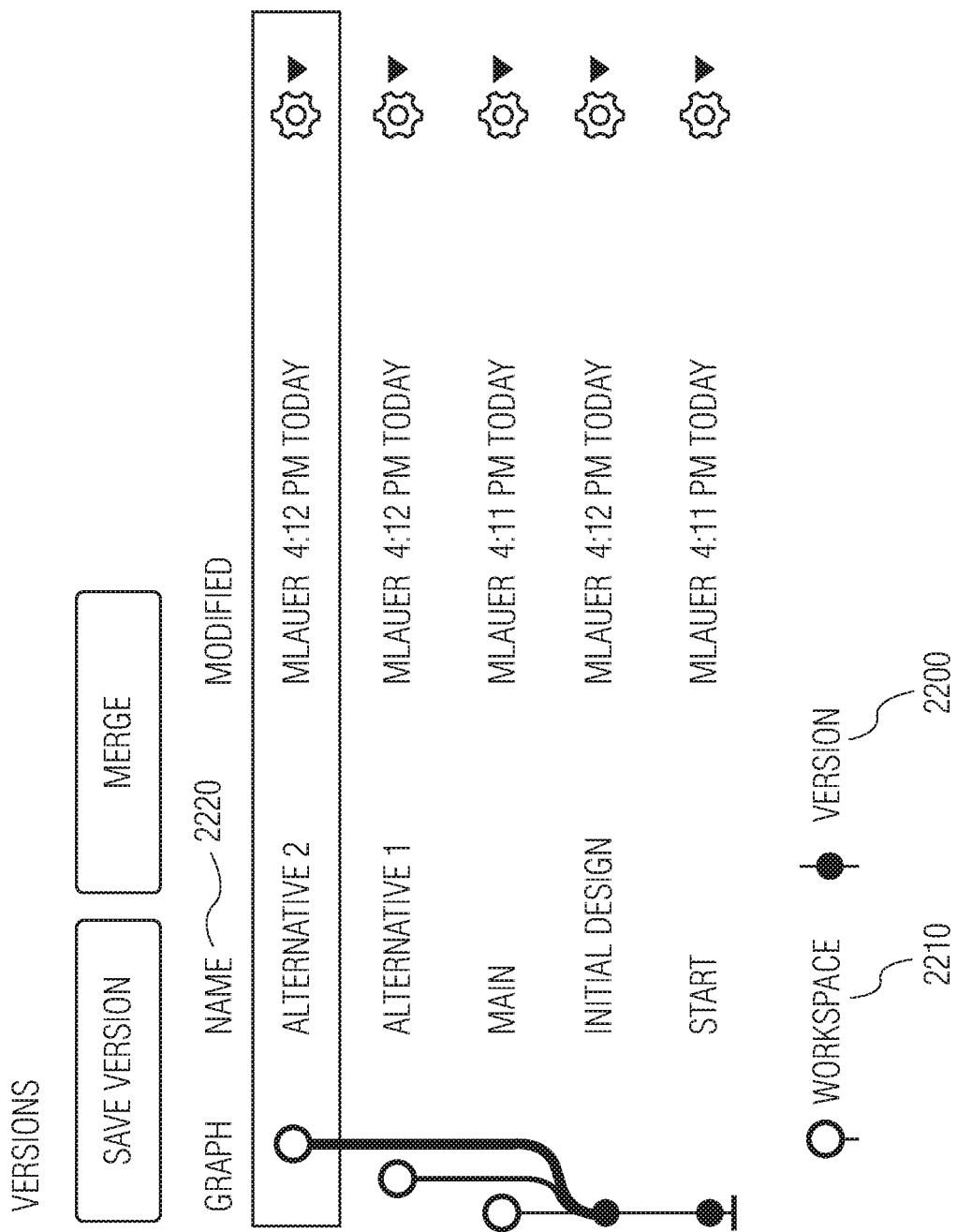
FIG. 22 shows the version manager.

Referring also to FIG. 22, the system provides a graphical representation of versions 2200 and workspaces 2210 in the Version Manager. As one or more users work in a project, each user can at any time mark a new version of the workspace. Users can also create a new workspace (branch) from a version. Note that marking a version and creating a new workspace are separate actions, as versions are read-only.

When viewing various versions, the name 2220 of the version appears beside the project title, and below that is a link to return to the workspace. Each version of a project is represented by a solid dot on the graph, and each workspace is indicated by an open circle. Users can create a new workspace from any version by selecting Branch from a user interface menu. Opposite to feature lists, the version graph grows from the bottom up with the first version of the project at the bottom of the graph.

Version actions include Open (open and switch to the graphics area for the selected version in view only mode), Open in new browser tab (open the selected version in a new browser tab in view only mode), Branch to create workspace (create a new branch and workspace from the selected version), and Properties (create or edit meta data about the selected version). Workspace actions include Open (switch to and open the graphics area for the selected workspace), Open in new browser tab (open the selected workspace in a new browser tab), History (view the persistent transaction history records for the selected workspace), Properties (create or edit meta data for the selected workspace), and Delete (delete the selected workspace; note that users cannot delete the last remaining workspace—to do so requires deleting the entire project).

Real world use cases illustrate examples which leverage the Version Manager functionality. When developing multiple variants independently, or when seeking regulatory approval in any number of different markets, users may use the Version Manager for a number of largely independent development efforts all contained in a single project. Each branch may hold changes specific to that market and the various parts and projects would reach release and regulatory approval states at different times. Another example use is when branching an initial design to evaluate a number of competing concepts with only one being chosen to develop to a release state. Another example use is when a large group of designers want to work independently on a number of ideas or changes that may or may not make it into the final design.

Sharing

Figure 23:
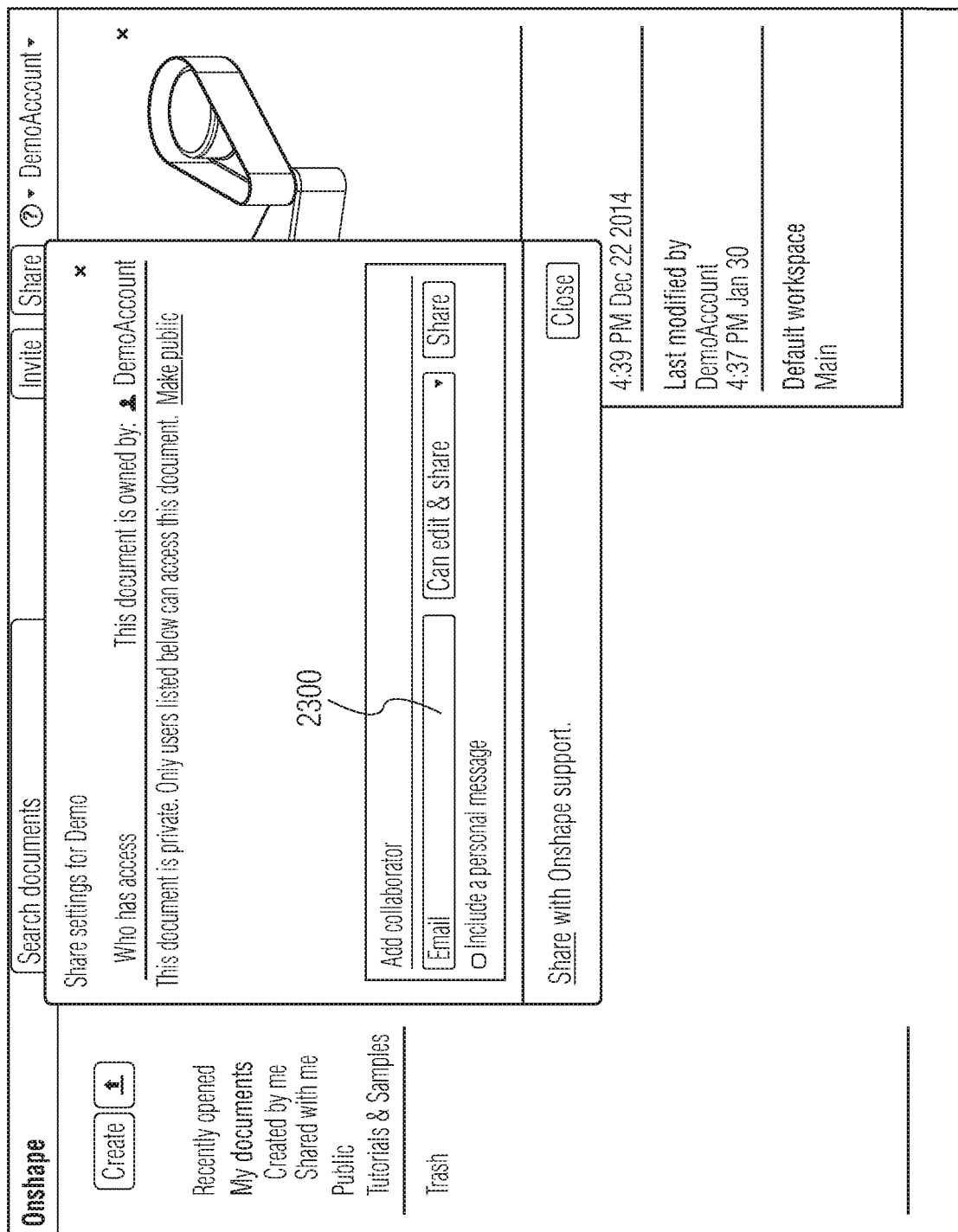
FIG. 23 shows sharing a project.

The system enables simultaneous editing between multiple users. Referring also to FIG. 23, users can share a project with whomever they want by entering the email address 2300 of someone to share it. Upon sharing, the DPS, AMBS, and AMCS generate an email notification about the shared project. If the share recipient is a registered user, the shared project is made available within that account. If the share recipient is not yet registered, the emailed notification includes information about creating an account in order to access the shared project. Different share permissions are available, including view (read-only), edit (read and edit), and edit & share (read, edit, and extend permissions to other users), and may be set when sharing or changed at any later point.

The user can choose to disallow any operations in the system that would allow the user to make copies of or download the data in the document. This could be available at any permission level. In other words, the sharee could be allowed to work within the document in a read-only manner or to edit the document. The sharee's access can also be removed whenever the user desires. These capabilities give the user greater control over who can access his data, how long they can access it, and how they can access it using the system. In prior CAD systems, data could only be shared by sending the sharee a copy of the file. Once the file was copied, the initial user no longer had any visibility or control over who accessed that file and who they distributed it too.

Projects allow both simultaneous editing (many users working together in one workspace of a project simultaneously) and branched editing (many users working independently but in parallel workspaces of a project with the ability to compare and merge later).

Figure 24:
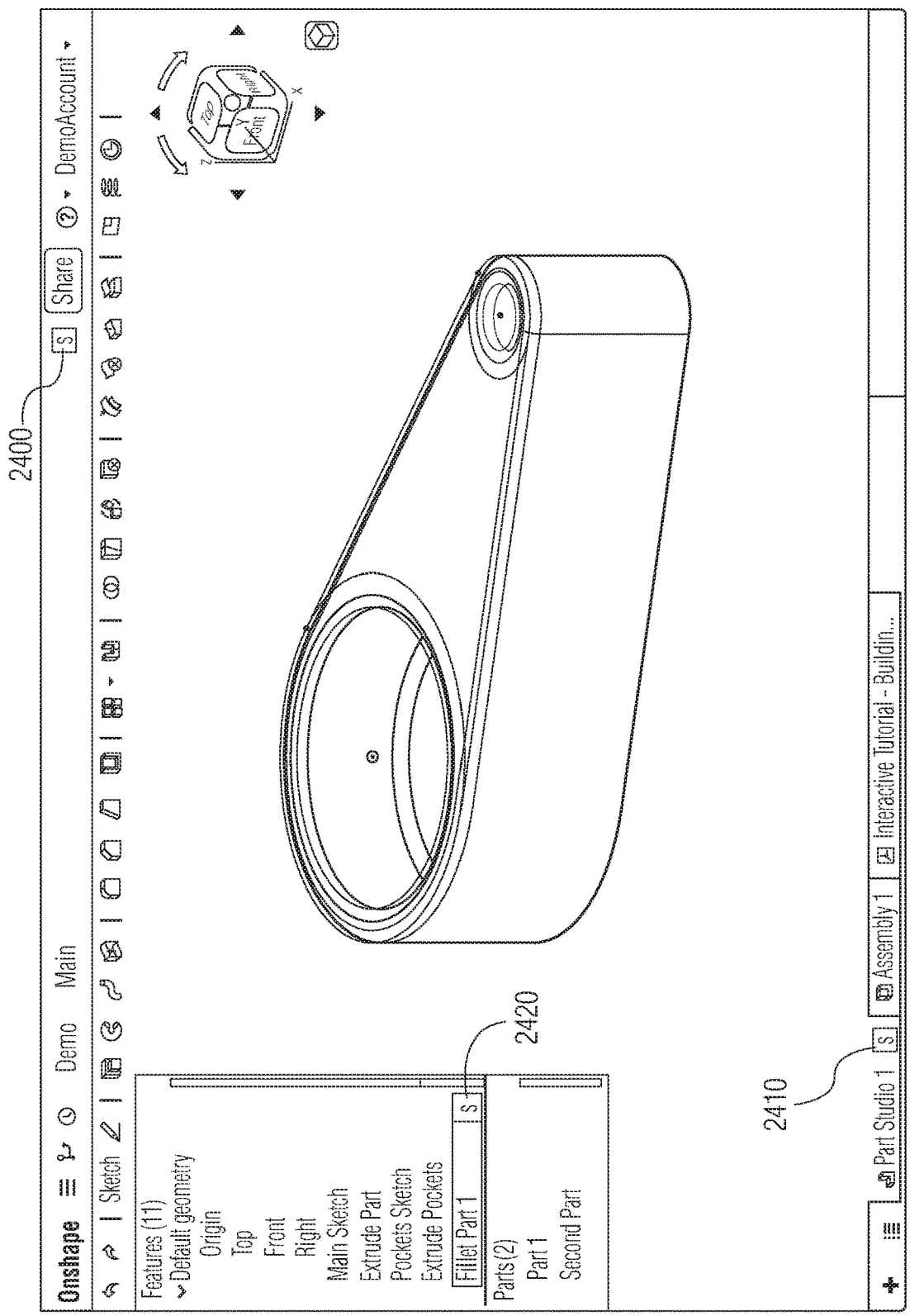
FIG. 24 shows multiple users working simultaneously within the same workspace.

Referring also to FIG. 24, users can work in the same project workspace at the same time, referred to as Simultaneous Editing. The creator of the project must Share it with the other users before they can collaborate. Within shared projects, social cues indicate what is being edited. Social cues may be graphical indicators, such as a colored box with letter indication an initial of a specific user's name, placed to identify who is viewing a project, which tab they are currently viewing, and any feature list items actively being viewed or edited. At the top is indication 2400 of who is actively viewing or editing the project. At the bottom, social cues 2410 in a tab indicate who is actively viewing or editing a file. At the side, social cues 2420 within the feature list or assembly feature list indicate users actively editing specific feature or assembly entities.

Branching

A user always works in an active workspace. A project may have many workspaces, which under most circumstances do not interact with each other. Any changes a user makes within an active workspace are immediately reflected in that workspace and not in any others; any collaborators in the same workspace are immediately updated.

A user may bookmark a particular state of a project workspace for future reference by saving a version, a permanent and immutable state of the project. A user may branch by creating a new workspace at a given version. The initial state of the project in the new workspace is identical to that of the version. Workspaces and versions form a directed acyclic graph with a "parent" relationship; the first "parent" of a workspace being the version it was branched from, and the parent of a version being the parent version of the workspace it was saved from. As described so far the graph is actually a tree.

Merging

Project branches (separate workspaces within the same project) may be merged together. A basic merging scenario involves one branch which contains all newer changes from another branch, and the user merging from that branch into the one to update. A more complex merging scenario involves a main workspace, or master design, and multiple branched workspaces for developing changes, with merging intended to incorporate some changes across multiple branches into the main workspace.

To handle all merging scenarios within a CAD system, the parametric history of each branch is compared as a linear list of features, with corresponding graphical representations. This is presented to a user to compare the two lists side by side textually in a similar manner to software comparison tools. The user may select or highlight any particular feature step in the parametric history, which optionally may display updated side-by-side or merged 3D graphical representations of each workspace at that feature step. This means that the user can both textually and visually understand the differences between the two models at that feature step. In addition to the text and graphical displays, dialogs for the selected feature for each branch may display with values from each workspace, and differences may be identified within the user interface such as through highlighting.

From the selected features, the user may incrementally push (merge) a change from one workspace into the other. The servers then regenerate the merged workspace incorporating the change, and the merge itself is tracked as a new change within the persistent transaction history of the workspace.

In this regard the system is doing much more than the similar compare and diff tools currently do in traditional software development. The CAD user sees three representations of the data (feature list, feature dialog, and graphical 3D model) of each different workspace of the project. The CAD user sees the actual regeneration results side by side at that step. In software, the analogy would be a tool that not only compared the text side-by-side, but also compiled and ran the program—and showed the different running programs in results.

With merging different branches, it is assumed that the definition of the shapes of parts occurs in a part modeling environment with a parametric history (Part Studio), and the definition of the assembly occurs in a separate assembly modeling environment (Assembly). The merging discussed above is focused on the part modeling environment.

In the assembly environment, as described above with respect to parts, any assembly can be deconstructed into a linear set of operations that construct the assembly. For example, an assembly can be deconstructed into a set of instance insertion steps, followed by a set of positioning steps (that position the instances in 3d space), followed by a set of constraint definition steps. There are other deconstructions that would work just as well—this is just one example.

Through deconstruction the assembly can be represented as a set of steps. These steps will generally be different and in a different order than the steps (feature list) the user actually used to create the assembly (unlike in the parametric part history). Nevertheless, they are easily understood by the user since they correspond to interactive tools that the CAD user uses to create assemblies.

Using these steps, and the user interface (such as dialogs) for the interactive tools, the assembly steps can be presented to the user in the same manner as the part feature steps were. The visual compare and incremental merge tools can then be used to compare and edit the assemblies.

Text-Feature-Editing

Figure 25:
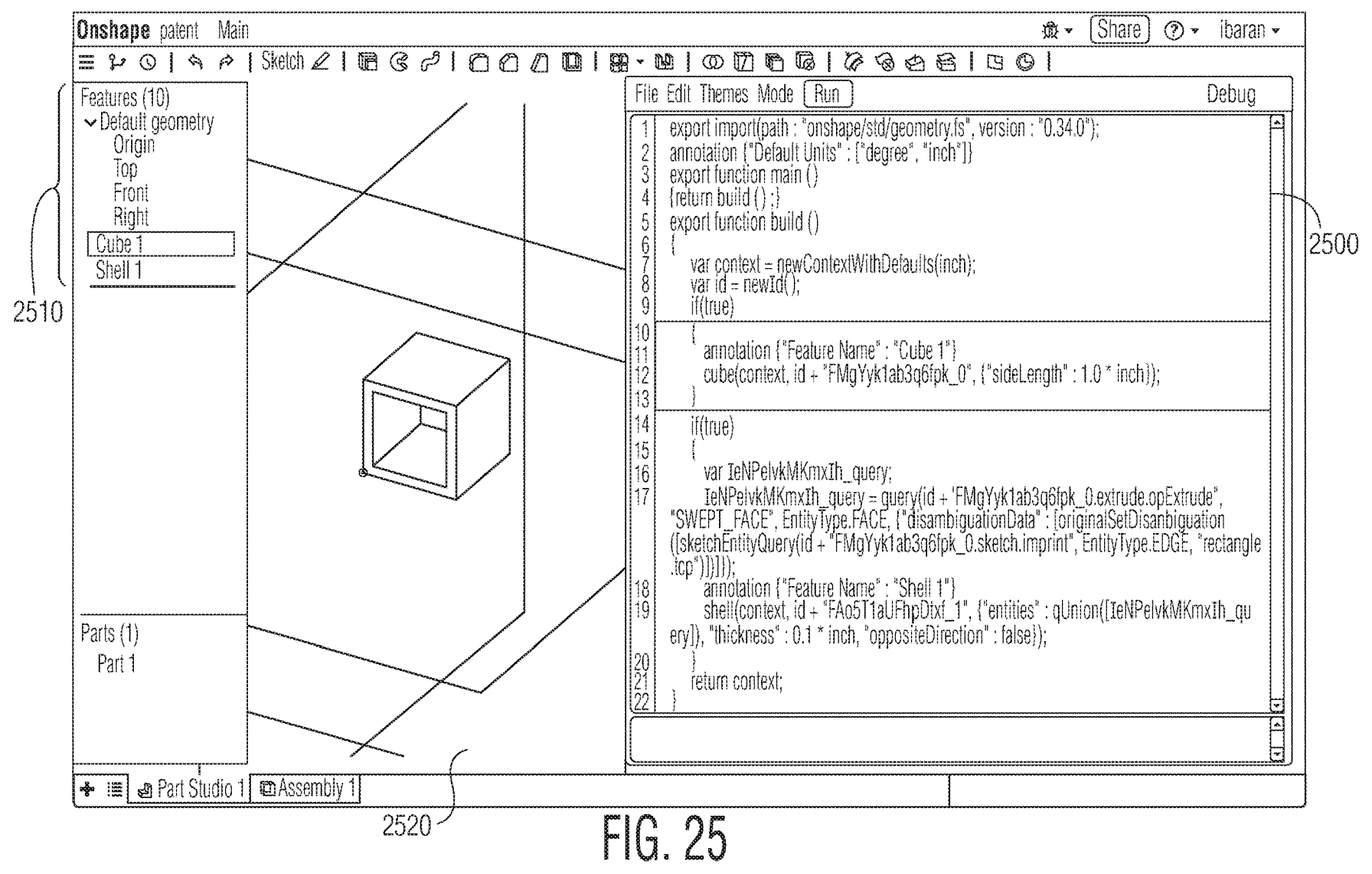

The feature selection with graphical correspondence discussed within merging exists during normal editing within a project. Making a selection within the graphics area may highlight or activate corresponding entries in the feature, and selecting within the feature list may highlight corresponding entities within the graphics area. Referring also to FIG. 25, this may be extended even further, and include a third representation as a code or script. The underlying implementation may maintain an abstract syntax tree (AST) 2500 of an object-oriented representation of a program corresponding to the CAD model, including the parametric feature list. Each entry in the feature list, with feature parameters and model definition components, corresponds to one or more subtrees of the AST. This correspondence allows cross-highlighting between the feature list 2510, a textual representation of the program 2500, and graphical display 2520. An optional overlay may display the textual representation, and enable three different, but corresponding, editing options. Edits to the feature tree, graphical area, or textual representation may be correspondingly updated across all three editing options. Similarly, when a user moves user interface control (e.g., the mouse pointer) over a feature or another portion of the GUI representation, the corresponding portion of the program text is highlighted.

Reference Manager

When working with a CAD design, many geometric elements may be created based on other geometries. The geometry and relationship data are tracked as references between objects. When working within a single parametric history, making any change can be visualized from the point of change all the way to the final design (with all later features also applied). When working with multiple parametric histories, the problem of any single change becomes more complex. With multiple part files and assemblies, making a change within one parametric history can trigger changes (and errors) within others.

When the related objects are generated by distinctly separate parametric histories in the context of an assembly, they are referred to as in-context references. When the context changes, by either changing the surrounding objects or removing an object from the context altogether for reuse elsewhere, references may become invalid and subsequently difficult to manage. A Reference Manager maintains a local context to keep these references in a valid, solvable state. Additionally, the Reference Manager provides a notification mechanism to inform users when in-context references are out of sync, and provides options for maintaining desired design intent.

The Reference Manager can be viewed as a tool to help a user through unresolved references by notification when unresolved conditions exist, flagging affected items, and offer resolution options. The Reference Manager is preferably a module operated by the CEWS. As a separate module, the Reference Manager may be operated as a separate module, and also integrated into other CAD systems (either as a separate module or directly as part of a main CAD software program). Thus, the Reference Manager may operate for multiple parametric histories within a project of the system, for references within a project which instance parametric histories (parts or sub-assemblies) and/or other parameter values, text, or other non-geometric data outside of the project's compound document, or for other CAD systems which use different storage techniques for parts and assemblies used instanced in a CAD design. Changing the geometry of any individual part can impact the assembly containing the part being changed, as well as any other assembly containing the part. The change can have an expanding greater impact if geometries of other parts are also changed to accommodate the change to the initial part. Changes may also impact other part features if they depend on the geometry of the part being changed. To ensure stable design while making part changes, the Reference Manager maintains copies of parts pre-change, inspects and tracks references of an assembly, redefines references when possible based on user changes, identifies and provides notification for out-of-sync conditions, and provides user options on how to handle out-of-sync conditions.

In-context references may be created in multiple different ways. In-context references may be created by sketches within the one parametric history referencing instances of parts created within a separate parametric history. Referring also to FIGS. 26A & 26B, one example of this is using one or more edges 2600 of one or more parts 2610 to define one or more the edges 2620 of another part 2630. As another example, a sketch may be on a plane generated from another parametric history. Referring also to FIG. 27, in-context references may also be created by features, such as defining end conditions for one part which depend on other parts (as shown, the cylinder 2700 bottom 2710 is defined by the top of the rectangular block 2720), defining one part's interaction with another part (such as to added to, subtracted from, or intersected with), specifying a face to split a body with, or defining a reference axis for rotation or reference edge for a pattern. References may also be created from an equations and variant table, which may contain expressions determining geometry such as a length or a line, or other dimensional value. All of the above refer to creation methods where items from one parametric history use items generated by a separate parametric history.

When an in-context reference is created, the Reference Manager creates a back-up geometry. The back-up geometry is a copy of a portion of the referenced object as it was at the time of reference creation. By maintaining a copy of the original referenced geometry, the system can treat the resultant object as independent with no dependency on the parent if desired. Instead of requiring the parent (or target) object to always be present and viable, this maintains completely resolved and correct objects independent of changes made in other parametric histories. Changes made in other parametric histories can be applied, but are not forced to be applied due to the backup geometry.

Figure 28:
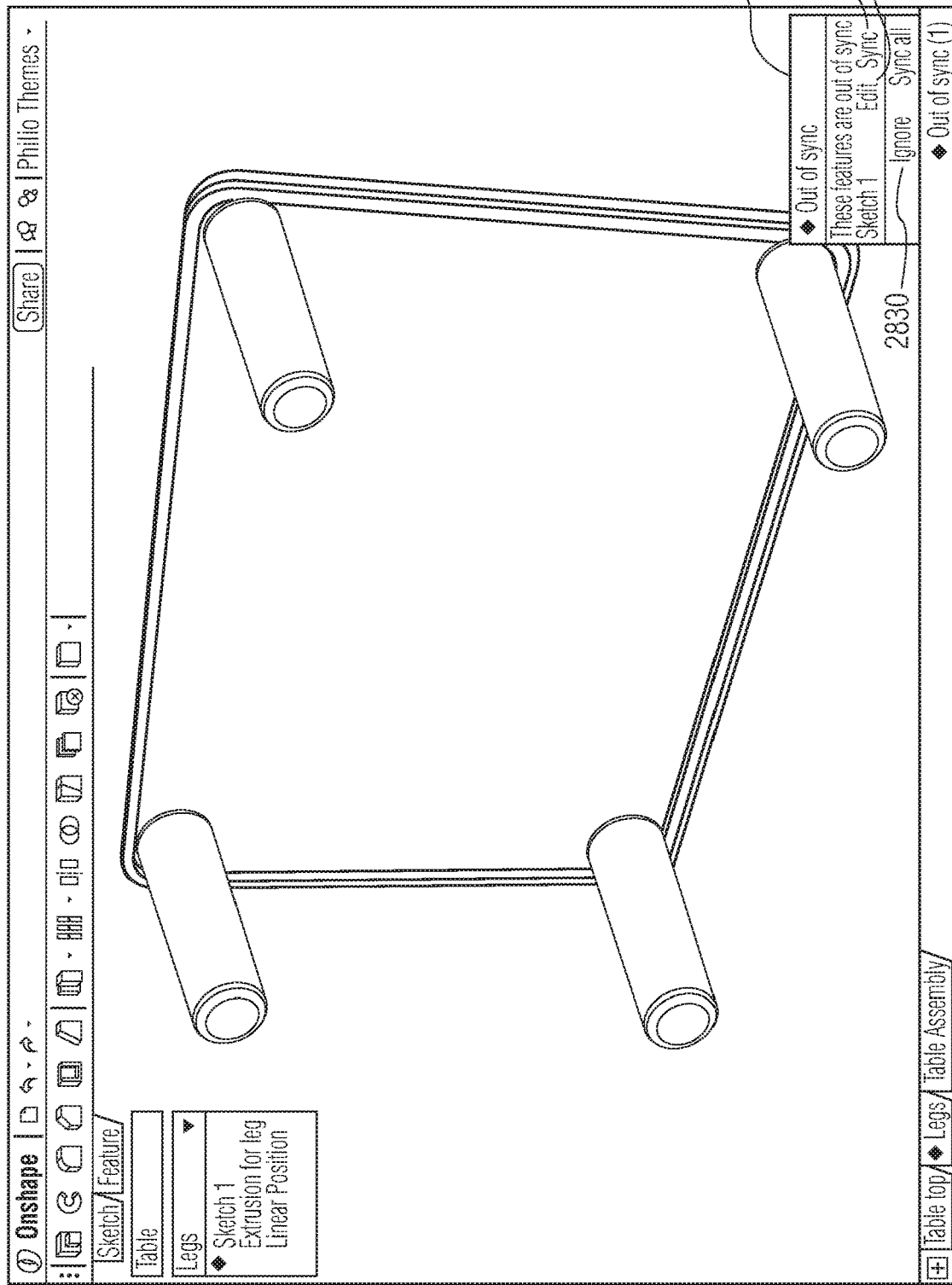
FIG. 28 shows detection of out-of-sync references.

When geometry or parameters of a part is changed, the Reference Manager examines references to determine if any problems have been introduced. Problems include assemblies or sub-assemblies which are cannot regenerate after the change, due to unsolvable conditions or conditions that results in multiple different possible solutions. Referring also to FIG. 28, if an out-of-sync condition exists due to a change in a separate parametric history altering a part used, notification 2800 is raised for the condition. Notification may be in the form of a flashed message or alert within the user interface, graphical indication on at tab having out-of-sync objects, textual identification of the number of out-of-sync objects, and graphical indication within the feature list of any features or parts which are out-of-sync.

Figure 29:
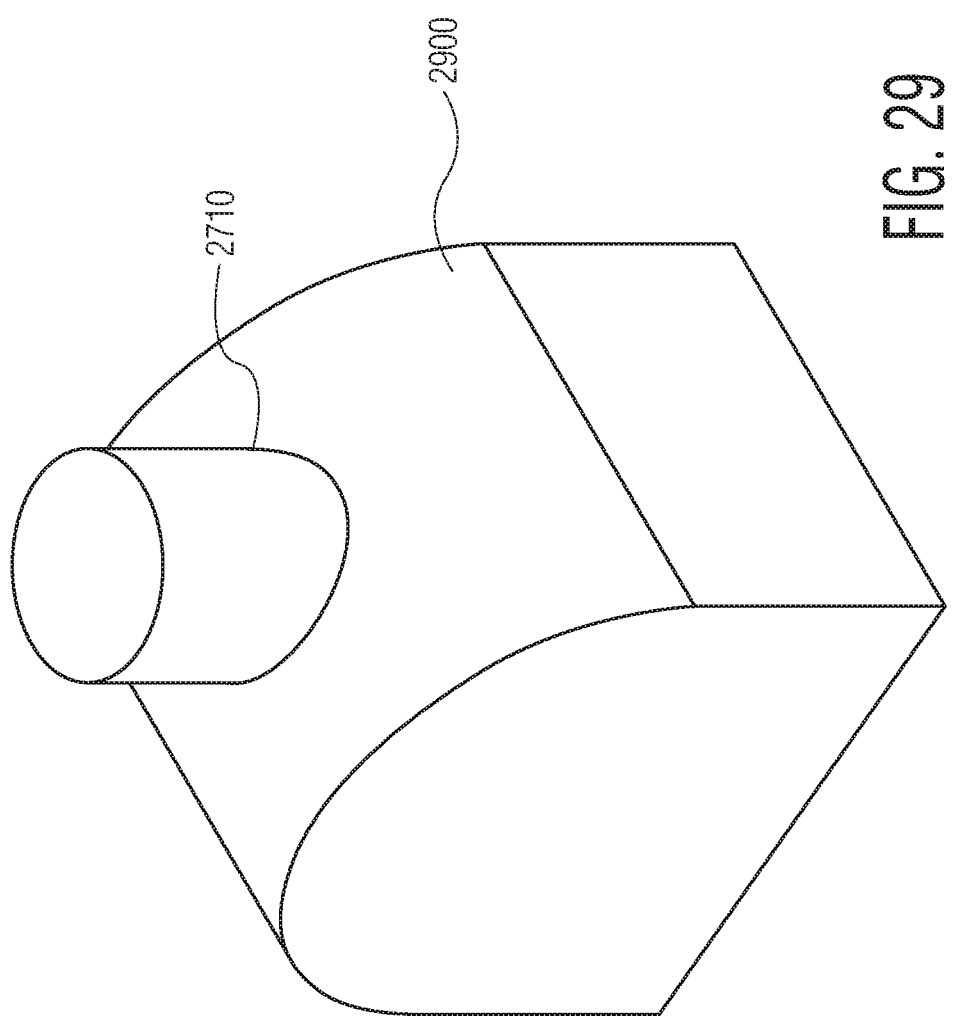
FIG. 29 shows resolving out-of-sync references through synchronizing.
Figure 30:
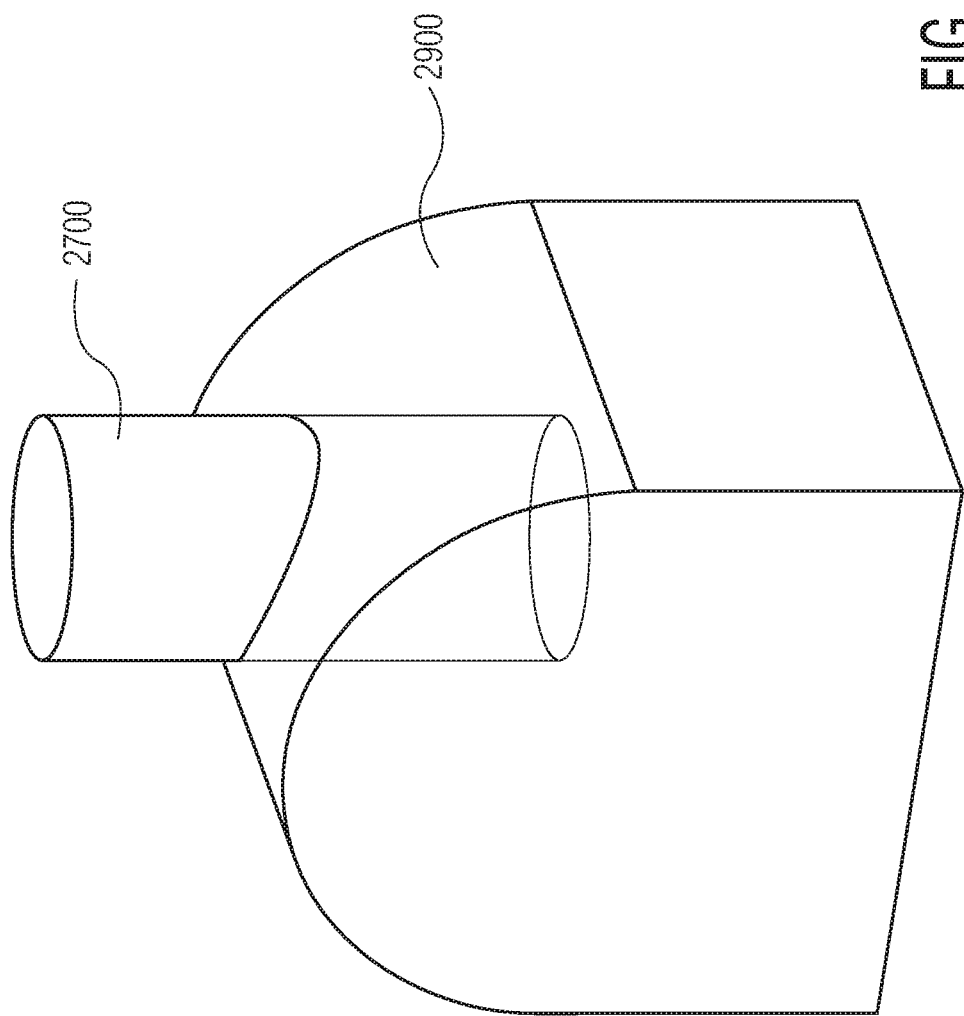
FIG. 30 shows resolving out-of-sync references through dismissing.

A user may select any of the notifications or corresponding graphics to address the out-of-sync conditions. From the selection, and referring also to FIG. 29, the user may sync 2810 or update with the changed (new) geometry. This selection causes the reference manager to replace the backup geometry with the changed geometry, and solve (through the 3DGCS) the new result (as shown, the cylinder bottom 2710 now curves to still align with the changed lower block 2900). If the change results in an alterable error condition, such as an editable feature is no longer resolvable, that editable entity (e.g., feature dialog) with error information may be presented to the user. Alternative to synchronizing and updating, if the reference is to an editable entity (e.g., a configurable feature), the user may choose to directly edit 2820 that entity, after which the out-of-sync reference may be replaced by the result of the edit. As another alternative, and referring also to FIG. 30, the user may choose to dismiss 2830 the changed reference. By selecting to dismiss, the changed geometry is ignored and the backup geometry is retained and used, maintaining the design in a solved state (as shown, the cylinder 2700 retains its prior shape with reference to the original block geometry, and therefore penetrates through the changed block 2900). If multiple out-of-sync references exist, the user may also choose to synchronize all or dismiss all, or synchronize or dismiss a selected set, rather than addressing each individually. Dismissing will retain a valid model (with the backup geometries), but synchronizing may result in errors needing correction from the user. Unresolvable references when synchronizing all are maintained in the out-of-sync state, allowing the user to individually address each reference (or, alternatively, attempt to synchronize all again in case nested reference updates allow previously unresolvable references to resolve).

The Reference Manager may similarly track assembly components connected through mate connectors. As an example, a component may be removed from an assembly in which it has been mated. A mate relationship is "attached" to the component, but unresolved because the corresponding geometry from its original mate component is no longer there. When the component is inserted into a new assembly context, the mate needs to be re-attached to new corresponding geometry. Back-up geometry may be utilized to find a proper match or inform the user to help them with manual attachment.

Other Embodiments

The figures and discussion related to inferencing focus on inferencing within a two dimensional sketch. In an alternative embodiment, inferencing may also be applied to curves and geometric entities within a three dimensional context, such as three dimensional sketching. In another alternative embodiment, the same approach and technology may be used when annotating views in a drawing.

In other alternative embodiments, the software operated by the system may be written in any of several widely available programming languages, and may be coded as a subroutine, module, subsystem, or object depending on the language and environment. It may be implemented in a client-server system as described. Alternatively, it may be implemented on a single computer to improve such behaviors if the complex behavior is very expensive to calculate. This applies to the entire system, as well as each individual part of the system.

In another alternative embodiment, individual users may operate multiple client programs at the same time under a single account. This allows effective self-collaboration by accessing the same project simultaneously from multiple interfaces on the same client device, or from multiple client programs across multiple client devices. This may be beneficial for presentations, such as presenting on a large screen or projector while controlling on a separate device, or for simultaneous experimentation or development of alternatives within the same project.

In addition to client apps provided for specific client device platforms, an alternative embodiment may provide an application programming interface (API) to access and operate the system. This allows integration of the system into other software packages, creation of specific applications implementing some or all of a client program, or automation of certain operations. For example, this may be beneficial for product manufacturers or three dimensional printers integrate directly with the system for accessing assemblies for production.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A system for executing three dimensional (3D) multi-user distributed parametric computer-aided design (CAD), the system comprising:
   one or more servers;
   one or more client devices connected over a network to the one or more servers;
   server software executed on one or more servers, the server software comprising code to:
      perform CAD geometry calculations including shape analysis and optimization of 3D graphics data,
      manage CAD editing workflow,
      manage user accounts and secure access,
      communicate with the one or more client devices,
      manage documents and storage including storing multiple files grouped together as a single data structure, the multiple files comprising data representations of assemblies, parts, and non-CAD data of a project encompassing the 3D CAD design,
      share the 3D CAD design between multiple users simultaneously accessible through multiple client devices,
      store all changes to the 3D CAD design as sequential changes applied within a workspace,
      store an immutable copy of the 3D CAD design at any particular change point as a version, and branch a separate workspace as newly ordered changes made from that version, and
      in response to a request to merge a feature from one workspace into a different workspace, regenerate the different workspace incorporating the feature and track the merge as a new change within the different workspace;
   client software executed on the one or more client devices, the client software comprising code to:
      render a user interface for displaying 3D CAD graphics for design and project management,
      display the multiple files of the project as tabbed document panes within the user interface,
      interact with user input and output controls to manipulate a 3D CAD design,
      communicate with the one or more servers,
      display a version manager listing all changes in all workspaces of the 3D CAD design as a sequential list or graph for selection and creation of versions,
      display a parametric history side-by-side for each of different workspaces of the 3D CAD design,
      enable user selection of any feature within the side-by-side parametric history, and
      when the selected feature is different between a selected workspace and a second workspace, and the user has selected to merge the feature, request the server software to merge the selected feature into the second workspace;
   wherein the 3D CAD design includes one or more parts and one or more assemblies consisting of connections and configurations of the one or more parts and sub-assemblies, and the client software further comprises code to enable a user to manipulate the parts and assemblies of the 3D CAD design through ordered feature lists.

2. The system of claim 1, wherein the client software further comprises code to enable user selection of any change, to request the server software to generate for display a 3D CAD model incorporating all sequential changes up to and including the selected change, and to display the generated model.

3. The system of claim 1, wherein the one or more servers include:
   one or more 3D geometry calculation servers (3DGCS) with server software including code to solve 3D constraints and perform geometry calculations modifying representations of geometric shapes;
   one or more data persistence servers (DPS) with server software to store user account information and data associated with the 3D CAD design;
   one or more CAD editing workflow servers (CEWS) with server software including code to receive user account, project interaction, and geometry modification messages from the one or more client devices, read and write CAD data from the one or more data persistence servers, and coordinate message exchange between the one or more client devices and the one or more 3DGCS;
   one or more two dimensional drawing editing workflow servers (2DDEWS) with server software including code to create and manipulate two dimensional (2D) drawings; one or more data cache persistence servers (DCPS) with server software including code to store and retrieve frequently accessed CAD model information;
   one or more document management web servers (DMWS) with server software including code to communicate with the one or more client devices and provide information about CAD designs accessible by users of the one or more client devices; and
   one or more distributed configuration controller servers (DCCS) with server software including code to communicate with and manage other servers and direct communications between the one or more client devices and appropriate specific CEWS based on any currently open 3D CAD designs, CEWS server load, CEWS performance, or geographic location.

4. The system of claim 1, wherein the client software further comprises code to request the server software to generate for display a 3D graphical representation of each different workspace at the selected feature, and display the generated 3D graphical representations.

5. The system of claim 1, wherein the client software further comprises code to display dialogs with values for the selected feature for each different workspace.

6. The system of claim 1, wherein
the server software further comprises code to:
deconstruct an assembly of a workspace of the 3D CAD design into a linear set of assembly operations that construct the assembly; and
in response to a request to merge an assembly operation from one workspace into a different workspace, regenerate the different workspace incorporating the assembly operation and track the merge as a new change within the different workspace; and
the client software further comprises code to:
display the linear set of assembly operations side-by-side for each of different workspaces of the 3D CAD design;
enable user selection of any assembly operation within the side-by-side linear sets of assembly operations; and
when the selected assembly operation is different between a selected workspace and a second workspace, and the user has selected to merge the assembly operation, request the server software to merge the selected assembly operation into the second workspace.

7. The system of claim 6, wherein the server software code to deconstruct an assembly of a workspace of the 3D CAD design further comprises software code to deconstruct the assembly into:
a set of instance insertion steps,
followed by a set of positioning steps, and
followed by a set of constraint definition steps.

8. A method for executing three dimensional (3D) multi-user distributed parametric computer-aided design (CAD), the method comprising:
executing server software on one or more servers, the server software:
performing CAD geometry calculations including shape analysis and optimization of 3D graphics data,
managing CAD editing workflow,
managing user accounts and secure access,
communicating with the one or more client devices,
managing documents and storage including storing multiple files grouped together as a single data structure, the multiple files comprising data representations of assemblies, parts, and non-CAD data of a project encompassing the 3D CAD design,
sharing the 3D CAD design between multiple users simultaneously accessible through multiple client devices,
storing all changes to the 3D CAD design as sequential changes applied within a workspace,
storing an immutable copy of the 3D CAD design at any particular change point as a version, and branch a separate workspace as newly ordered changes made from that version, and
in response to a request to merge a feature from one workspace into a different workspace, regenerating the different workspace incorporating the feature and tracking the merge as a new change within the different workspace;
executing client software on one or more client devices, the client software:
rendering a user interface displaying 3D CAD graphics for design and project management,
displaying the multiple files of the project as tabbed document panes within the user interface,
interacting with user input and output controls to manipulate a 3D CAD design,
communicating with the one or more servers;
displaying a version manager listing all changes in all workspaces of the 3D CAD design as a sequential list or graph for selection and creation of versions,
displaying a parametric history side-by-side for each of different workspaces of the 3D CAD design,
enabling user selection of any feature within the side-by-side parametric history,
when the selected feature is different between a selected workspace and a second workspace, and the user has selected to merge the feature, requesting the server software to merge the selected feature into the second workspace;
wherein the 3D CAD design includes one or more parts and one or more assemblies consisting of connections and configurations of the one or more parts and sub-assemblies, and the client software further enables a user to manipulate the parts and assemblies of the 3D CAD design through ordered feature lists.

9. The method of claim 8, further comprising the client software:
requesting the server software to generate for display a 3D graphical representation of each different workspace at the selected feature, and
displaying the generated 3D graphical representations.

10. The method of claim 8, further comprising the client software displaying dialogs with values for the selected feature for each different workspace.

11. The method of claim 8, further comprising:
the server software:
deconstructing an assembly of a workspace of the 3D CAD design into a linear set of assembly operations that construct the assembly; and
in response to a request to merge an assembly operation from one workspace into a different workspace, regenerating the different workspace incorporating the assembly operation and track the merge as a new change within the different workspace; and
the client software:
displaying the linear set of assembly operations side-by-side for each of different workspaces of the 3D CAD design;
enabling user selection of any assembly operation within the side-by-side linear sets of assembly operations; and
when the selected assembly operation is different between a selected workspace and a second workspace, and the user has selected to merge the assembly operation, requesting the server software to merge the selected assembly operation into the second workspace.

12. The method of claim 11, wherein deconstructing an assembly of a workspace of the 3D CAD design further comprises deconstructing the assembly into:
a set of instance insertion steps,
followed by a set of positioning steps, and
followed by a set of constraint definition steps.

* * * * *